(12) United States Patent
Gao et al.

(10) Patent No.: US 11,128,888 B2
(45) Date of Patent: Sep. 21, 2021

(54) METHOD AND APPARATUS FOR VIDEO DECODING

(71) Applicant: Tencent Technology (Shenzhen) Company Limited, Shenzhen (CN)

(72) Inventors: Xinwei Gao, Shenzhen (CN); Xunan Mao, Shenzhen (CN); Chenchen Gu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 16/991,741

(22) Filed: Aug. 12, 2020

(65) Prior Publication Data

US 2020/0374547 A1 Nov. 26, 2020

Related U.S. Application Data

(63) Continuation of application No. PCT/CN2019/090682, filed on Jun. 11, 2019.

(30) Foreign Application Priority Data

Jun. 20, 2018 (CN) .......................... 201810635813.6

(51) Int. Cl.
*H04N 7/12* (2006.01)
*H04N 19/523* (2014.01)
(Continued)

(52) U.S. Cl.
CPC ......... *H04N 19/523* (2014.11); *H04N 19/124* (2014.11); *H04N 19/147* (2014.11);
(Continued)

(58) Field of Classification Search
CPC .. H04N 19/523; H04N 19/124; H04N 19/147; H04N 19/172; H04N 19/513;
(Continued)

(56) References Cited

U.S. PATENT DOCUMENTS

| 7,620,109 B2 * | 11/2009 | Srinivasan | ............. | H04N 19/61 |
| | | | | 375/240.29 |
| 8,102,468 B2 * | 1/2012 | Inoue | ................... | H04N 7/0137 |
| | | | | 348/441 |

(Continued)

FOREIGN PATENT DOCUMENTS

| CN | 101778275 A | 7/2010 |
| CN | 102196256 A | 9/2011 |

(Continued)

OTHER PUBLICATIONS

International Search Report and Written Opinion for International Application No. PCT/CN2019/090682 dated Sep. 11, 2019; 13 pages.

(Continued)

*Primary Examiner* — Gims S Philippe
(74) *Attorney, Agent, or Firm* — Crowell & Moring LLP

(57) ABSTRACT

This application relates to a method and apparatus, a storage medium, and a computer device for video encoding and decoding. The video encoding method includes: acquiring a reference frame corresponding to a current frame to be encoded from a video input; determining a sub-pixel interpolation mode, the sub-pixel interpolation mode comprising one of a direct sub-pixel interpolation mode or a sampled sub-pixel interpolation mode; processing the reference frame according to resolution information of the current frame using an interpolation in the sub-pixel interpolation mode, to obtain a corresponding target reference frame; and encoding the current frame according to the target reference frame, to obtain encoded data corresponding to the current frame. By using the foregoing video encoding method, a reference frame corresponding to a current frame to be encoded can be flexibly selected, thereby effectively improving the utilization efficiency of reference frames.

20 Claims, 12 Drawing Sheets

(51) Int. Cl.
*H04N 19/124* (2014.01)
*H04N 19/147* (2014.01)
*H04N 19/172* (2014.01)
*H04N 19/513* (2014.01)
*H04N 19/59* (2014.01)

(52) U.S. Cl.
CPC ......... *H04N 19/172* (2014.11); *H04N 19/513* (2014.11); *H04N 19/59* (2014.11)

(58) Field of Classification Search
CPC ...... H04N 19/59; H04N 19/117; H04N 19/52; H04N 19/105; H04N 19/176
USPC ..................................................... 375/240.03
See application file for complete search history.

(56) References Cited

U.S. PATENT DOCUMENTS

| | | | |
|---|---|---|---|
| 2003/0156646 A1 | 8/2003 | Hsu et al. | |
| 2007/0223589 A1* | 9/2007 | Park | H04N 19/40 375/240.16 |
| 2010/0128170 A1* | 5/2010 | Hirai | H04N 19/523 348/441 |
| 2010/0208086 A1 | 8/2010 | Kothandaraman et al. | |
| 2012/0082242 A1* | 4/2012 | Narroschke | H04N 19/46 375/240.25 |
| 2012/0147967 A1* | 6/2012 | Panchai | H04N 19/154 375/240.17 |
| 2012/0183208 A1* | 7/2012 | Sharman | G06T 3/4007 382/162 |
| 2012/0275511 A1 | 11/2012 | Shemer et al. | |
| 2013/0121420 A1 | 5/2013 | Heng et al. | |

FOREIGN PATENT DOCUMENTS

| | | |
|---|---|---|
| CN | 102438135 A | 5/2012 |
| CN | 106101709 A | 11/2016 |
| CN | 107155107 A | 9/2017 |
| CN | 108833916 A | 11/2018 |

OTHER PUBLICATIONS

Office Action with English Translation of Concise Explanation of Relevance for Chinese Patent Application No. 201810635813.6 dated Apr. 30, 2021; 12 pages.

* cited by examiner

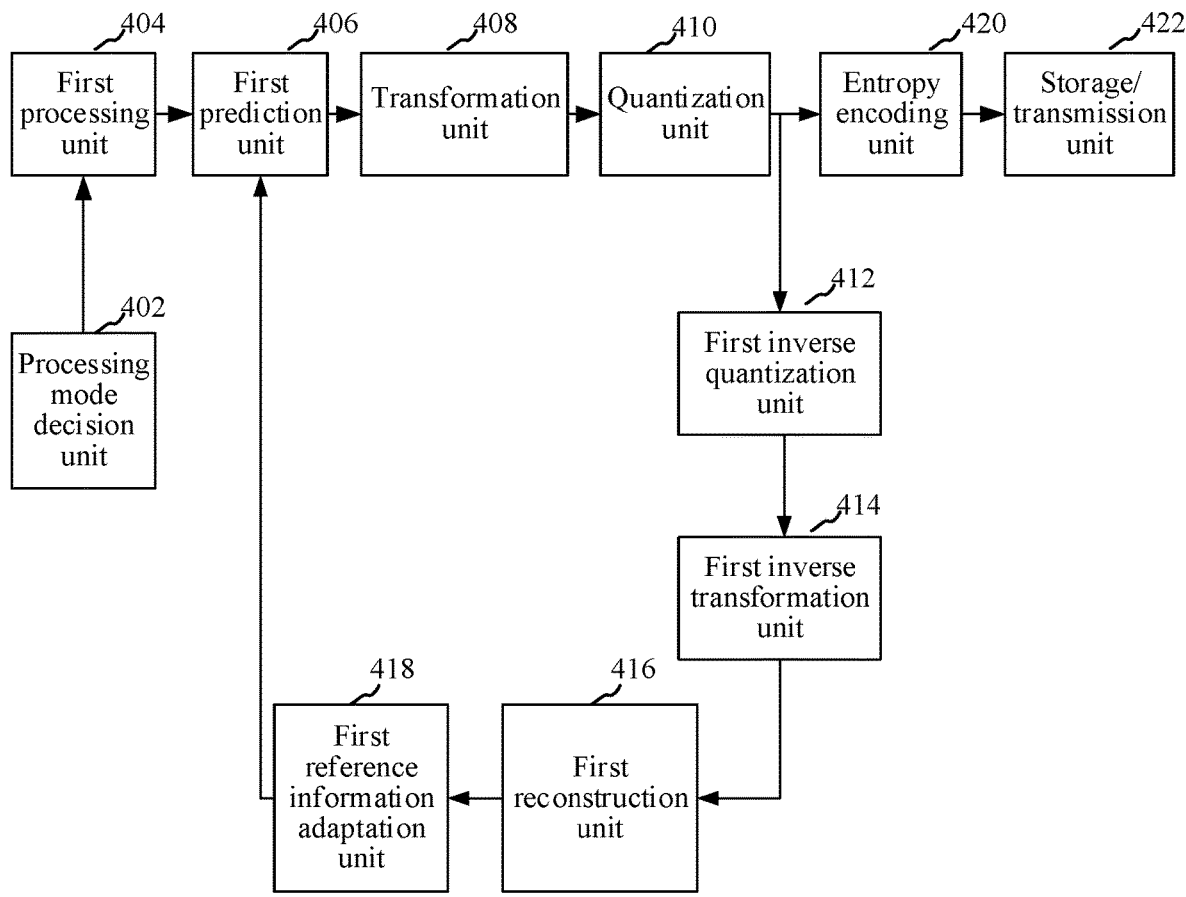
FIG. 4
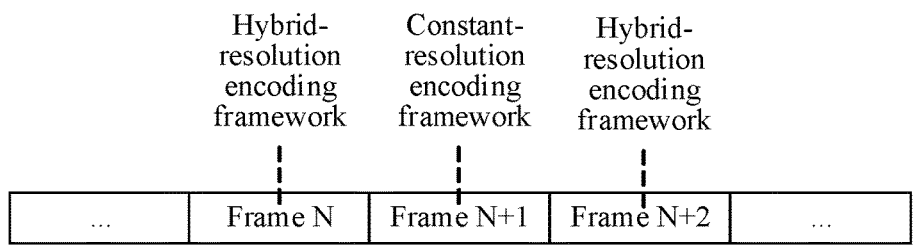
FIG. 5
| | ... | ... | ... | ... | ... | ... | |
|---|---|---|---|---|---|---|---|
| ... | C1 | c11 | A1 | a11 | B1 | b11 | ... |
| ... | c13 | c12 | a13 | a12 | b13 | b12 | ... |
| ... | C2 | c21 | A2 | a21 | B2 | b21 | ... |
| ... | c23 | c22 | a23 | a22 | b13 | b22 | ... |
| ... | C3 | c31 | A3 | a31 | B3 | b31 | ... |
| ... | c33 | c32 | a33 | a32 | b33 | b32 | ... |
| | ... | ... | ... | ... | ... | ... | |
FIG. 6(1)

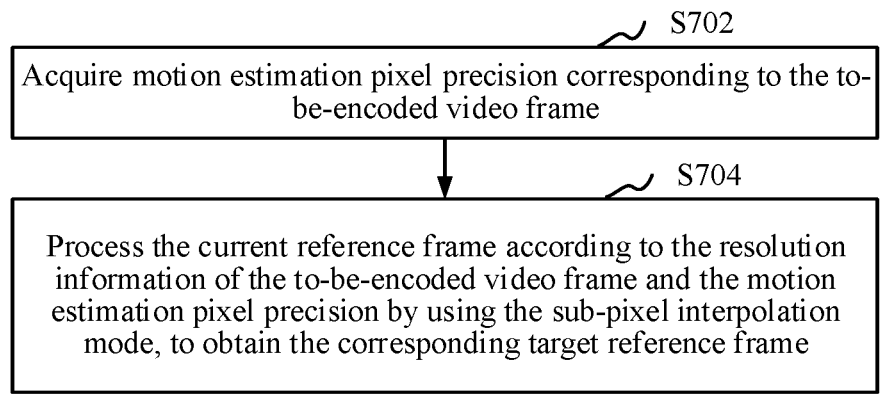
FIG. 6(2)
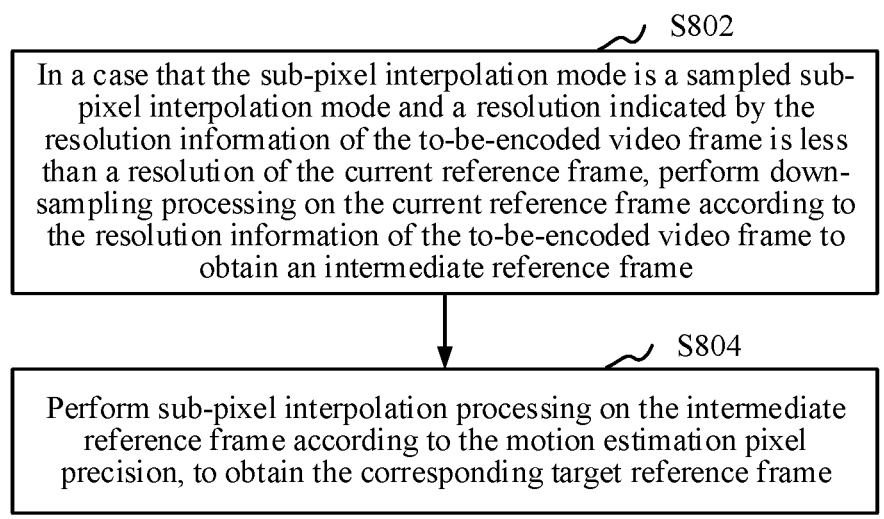
FIG. 7
FIG. 8

METHOD AND APPARATUS FOR VIDEO DECODING

RELATED APPLICATION

This application is a continuation application of the International PCT Application No. PCT/CN2019/090682, filed with the National Intellectual Property Administration, PRC on Jun. 11, 2019 which claims priority to Chinese Patent Application No. 201810635813.6, entitled "VIDEO ENCODING METHOD AND APPARATUS, VIDEO DECODING METHOD AND APPARATUS, STORAGE MEDIUM, AND COMPUTER DEVICE" and filed with the National Intellectual Property Administration, PRC on Jun. 20, 2018, which are incorporated herein by reference in their entireties.

FIELD OF THE TECHNOLOGY

This application relates to the field of computer technologies, and in particular, to a method and apparatus, a video decoding method and apparatus, a storage medium, and a computer device for video encoding.

BACKGROUND OF THE DISCLOSURE

With the development of digital media technologies and computer technologies, videos are applied to many fields such as mobile communication, network monitoring, and network television. With the improvement of hardware performance and screen resolution, demand for high-definition videos is increasing.

With a limited bandwidth, video quality may be poor in some scenarios if a conventional encoder is used which encodes video frames indiscriminately. For example, during indiscriminate encoding of all video frames at a bit rate of 750 kbps, all referenced video frames have the same resolution, and only reference frames with the same resolution can be referenced for the video frames, resulting in low utilization efficiency of reference frames and an inflexible reference relationship.

SUMMARY

Embodiments of this application provide a method and apparatus, a video decoding method and apparatus, a storage medium, and a computer device for video encoding, so that a current frame to be encoded from a video input may be encoded with reference to a specific reference frame if reference frames have different resolutions, the utilization efficiency of reference frames can be improved, a reference relationship between video frames becomes more flexible, and the technical problem that the utilization efficiency of reference frames is not high because all video frames are encoded indiscriminately in the related art can be resolved.

A video encoding method is provided, the method being performed by a computer device, the method including:

acquiring a reference frame corresponding to a current frame to be encoded from a video input;

determining a sub-pixel interpolation mode, the sub-pixel interpolation mode comprising one of a direct sub-pixel interpolation mode and a sampled sub-pixel interpolation mode;

processing the reference frame according to resolution information of the current frame using the sub-pixel interpolation mode, to obtain a corresponding target reference frame; and encoding the current frame according to the target reference frame, to obtain encoded data corresponding to the current frame.

A video encoding apparatus is provided, the apparatus being applied to a computer device, the apparatus including:

a reference frame acquisition module, configured to acquire a reference frame corresponding to a current frame to be encoded from a video input;

a sub-pixel interpolation mode determination module, configured to determine a sub-pixel interpolation mode, the sub-pixel interpolation mode comprising one of a direct sub-pixel interpolation mode and a sampled sub-pixel interpolation mode;

a target reference frame determination module, configured to process the reference frame according to resolution information of the current frame by using the sub-pixel interpolation mode, to obtain a corresponding target reference frame; and an encoded data obtaining module, configured to encode the current frame according to the target reference frame, to obtain encoded data corresponding to the current frame.

A computer-readable storage medium is provided, storing a computer program, and the computer program, when being executed by a processor, causing the processor to perform the steps of the foregoing video encoding method.

A computer device is provided, including a memory and a processor, the memory storing a computer program, and the computer program, when being executed by the processor, causing the processor to perform the steps of the foregoing video encoding method.

By using the foregoing video encoding method and apparatus, storage medium, and computer device, after a reference frame corresponding to a current frame is acquired, a sub-pixel interpolation mode of the reference frame may be determined. Then based on the resolution of the reference frame, the reference frame is processed and the resolution of the reference frame may be adjusted to obtain a target reference frame. As such, even if the resolution of the reference frame is different from that of the current frame, the reference frame may still be used as a reference frame for the current frame after the adjustment. The current frame is encoded according to the obtained target reference frame, thereby improving the utilization efficiency of reference frames, so that the accuracy of inter prediction can be improved, a prediction residual can be reduced, and the quality of an encoded image can be improved.

A video decoding method is provided, the method being performed by a computer device, the method including:

acquiring encoded data corresponding to a current frame to be decoded from a video input;

acquiring a reference frame corresponding to the current frame;

determining a sub-pixel interpolation mode, the sub-pixel interpolation mode comprising one of a direct sub-pixel interpolation mode and a sampled sub-pixel interpolation mode;

processing the reference frame according to resolution information of the current frame by using the sub-pixel interpolation mode, to obtain a corresponding target reference frame; and decoding the encoded data according to the target reference frame, to obtain a reconstructed video frame corresponding to the current frame.

A video decoding apparatus is provided, the apparatus being applied to a computer device, the apparatus including:

an encoded data acquisition module, configured to acquire encoded data corresponding to a current frame to be decoded from a video input;

a reference frame acquisition module, configured to acquire a reference frame corresponding to the current frame;

a sub-pixel interpolation mode determination module, configured to determine a sub-pixel interpolation mode, the sub-pixel interpolation mode comprising one of a direct sub-pixel interpolation mode and a sampled sub-pixel interpolation mode;

a target reference frame determination module, configured to process the reference frame according to resolution information of the current frame by using the sub-pixel interpolation mode, to obtain a corresponding target reference frame; and a reconstructed video frame obtaining module, configured to decode the encoded data according to the target reference frame, to obtain a reconstructed video frame corresponding to the current frame.

A computer-readable storage medium is provided, storing a computer program, and the computer program, when being executed by a processor, causing the processor to perform the steps of the foregoing video decoding method.

A computer device is provided, including a memory and a processor, the memory storing a computer program, and the computer program, when being executed by the processor, causing the processor to perform the steps of the foregoing video decoding method.

By using the foregoing video decoding method and apparatus, storage medium, and computer device, after encoded data corresponding to a current frame to be decoded and a reference frame corresponding to the current frame are acquired, a sub-pixel interpolation mode of the reference frame may be determined. Then based on the resolution of the reference frame, the reference frame is processed and the resolution of the reference frame may be adjusted to obtain a target reference frame. As such, even if the resolution of the reference frame is different from that of the current frame, the reference frame may still be used as a reference frame for the current frame after the adjustment. The current frame is decoded according to the obtained target reference frame, thereby improving the utilization efficiency of reference frames, so that the accuracy of inter prediction can be improved, a prediction residual can be reduced, and the quality of an encoded image can be improved. In this application, inter prediction may also be referred to as inter-frame prediction.

BRIEF DESCRIPTION OF THE DRAWINGS

FIG. 4 is a schematic diagram of a hybrid-resolution encoding framework according to an embodiment.

FIG. 5 is a schematic diagram of encoding an input video frame with different resolutions according to an embodiment.

FIG. 6(1) is a schematic diagram of performing pixel interpolation with pixel precision of 1/2 on a reference frame according to an embodiment.

FIG. 6(2) is a schematic diagram of performing pixel interpolation with pixel precision of 1/4 on a reference frame according to an embodiment.

FIG. 7 is a schematic flowchart of processing a reference frame according to resolution information of a video frame by using a sub-pixel interpolation to obtain a corresponding target reference frame according to an embodiment.

FIG. 8 is a schematic flowchart of processing a reference frame according to resolution information of a video frame and motion estimation pixel precision by using a sub-pixel interpolation to obtain a corresponding target reference frame according to an embodiment.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used to describe this application, instead of limiting this application.

Figure 1:
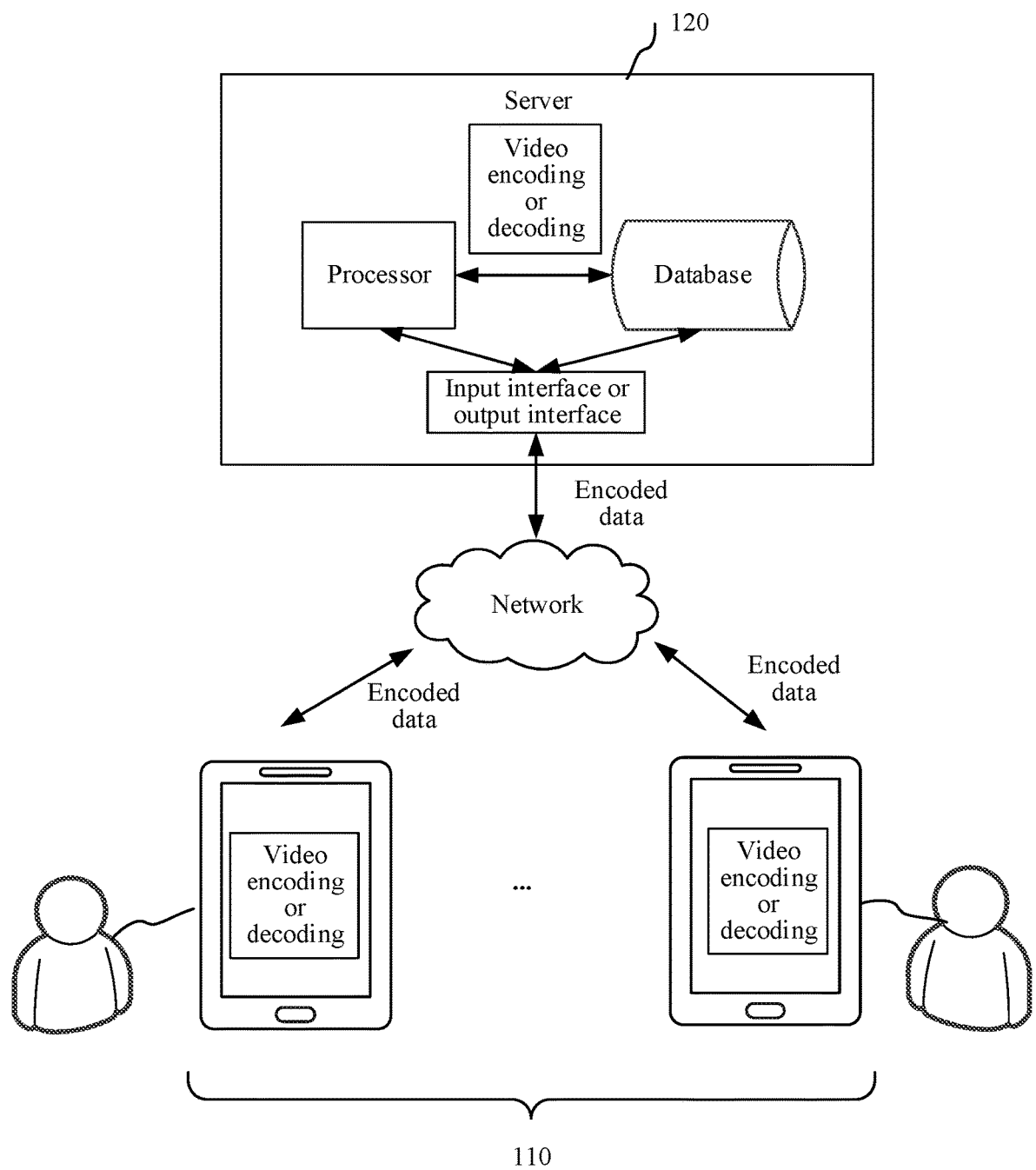
FIG. 1 is a diagram of an exemplary application environment of a video encoding method according to an embodiment.

FIG. 1 is a diagram of an application environment of a video encoding method according to an embodiment. Referring to FIG. 1, the video encoding method is applied to a video encoding system. The video encoding system includes a terminal 110 and a server 120. The terminal 110 is connected to the server 120 by a network. The terminal 110 may be, but is not limited to, a desktop terminal or a mobile terminal, and the mobile terminal may be specifically at least one of a mobile phone, a tablet computer, a notebook computer, and the like, there is no limitation imposed in this application. The server 120 may be implemented by using an independent server or a server cluster that includes a plurality of servers.

The video encoding method and the video decoding method may be implemented in the terminal 110 or the server 120. The terminal 110 may encode a current frame by using the video encoding method, and then transmit the encoded video frame to the server 120, or receive encoded data from the server 120, decode the encoded data by using the video decoding method, and then generate a reconstructed video frame. The server 120 may perform transcoding on a code stream during storage. In this case, the video encoding method is completed on the server. If the server 120 needs to decode the code stream, the video decoding method is completed on the server. It may be understood that an encoding end and a decoding end may be the same end or different ends. The computer device, for example, a terminal or a server, may be an encoding end or a decoding end, or both an encoding end and a decoding end.

Referring to FIG. 1, the terminal 110 or the server 120 may perform video encoding by using an encoder or video decoding by using a decoder. The terminal 110 or the server 120 may also perform video encoding by using a processor running a video encoding program or video decoding by using a processor running a video decoding program. After receiving, through an input interface, encoded data transmitted by the terminal 110, the server 120 may directly transfer the encoded data to the processor for decoding, or may store the encoded data in a database for subsequent decoding. After obtaining encoded data by encoding an original video frame by the processor, the server 120 may directly transmit the encoded data to the terminal 110 through an output interface, or may store the encoded data in a database for subsequent transfer.

In a possible application scenario, the video encoding method and the video decoding method provided in this application may be applied to an application having a video call function. The application may be a social application or an instant messaging application. During a video call between two terminals installed with embodiments of the application, a first terminal acquires a video frame by using a camera, encodes the video frame by using a video encoding function of an application, to obtain encoded data, and transmits the encoded data to a background server of the application. The background server forwards the encoded data to a second terminal. After receiving the encoded data, the second terminal decodes the encoded data by using a video decoding function of the application, and performs reconstruction to obtain a video frame, so as to display the video frame. Similarly, the second terminal may transmit the encoded data obtained through encoding to the first terminal by using the background server, and the first terminal performs decoding and display, thereby implementing a video call between the two parties.

In another possible application scenario, the video encoding method and the video decoding method provided in this application may be applied to an application having a video playback function. The application may be a video live streaming application, a short video application or a video playback application. A terminal installed with embodiments of the application may acquire a video frame by using a camera, encode the video frame by using a video encoding function of the application, to obtain encoded data, and transmit the encoded data to a background server of the application. If another terminal requests to watch the video, the background server transmits encoded data of the video to the other terminal. An application on the other terminal decodes the encoded data, to play the video.

Certainly, the foregoing several possible application scenarios are only used for exemplary description. The video encoding method and video decoding method provided in the embodiments of this application may further be applied to any scenarios that require video encoding and decoding. This is not limited in the embodiments of this application.

Figure 2:
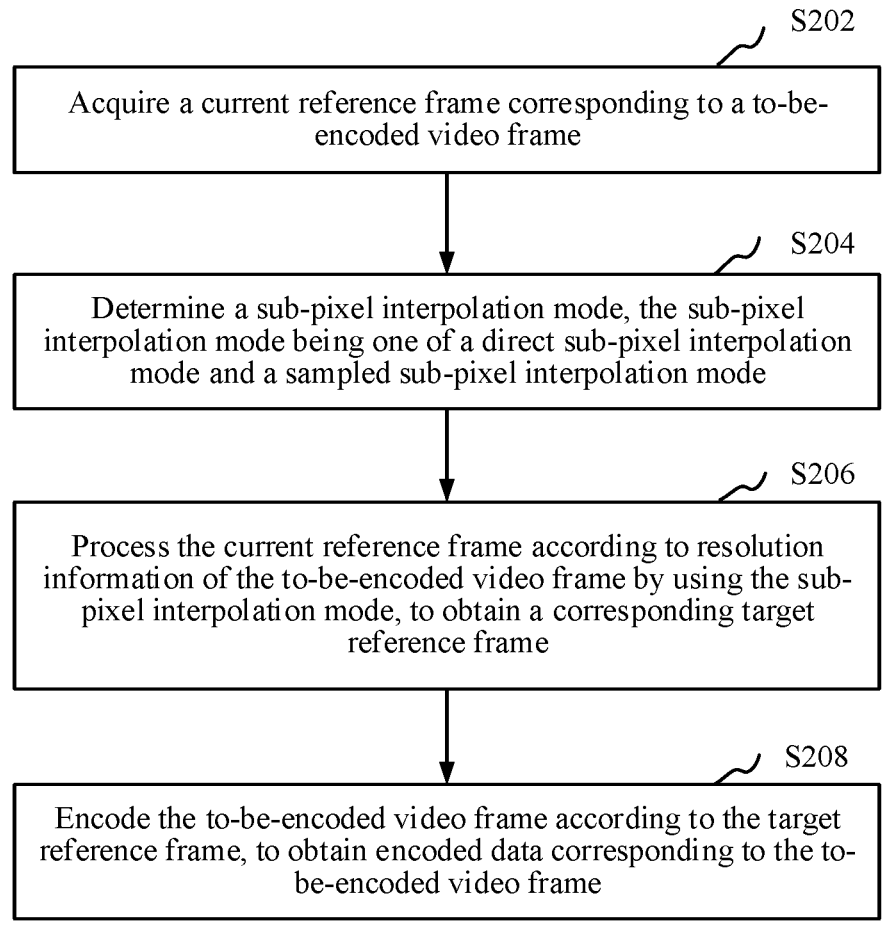
FIG. 2 is a schematic flowchart of a video encoding method according to an embodiment.

As shown in FIG. 2, in an embodiment, a video encoding method is provided. This embodiment is described by using an example in which the method is applied to the terminal 110 or the server 120 in FIG. 1. Referring to FIG. 2, the video encoding method specifically includes the following steps.

S202: Acquire a reference frame corresponding to a current frame to be encoded from a video input.

The current frame may be a video frame acquired in real time or a video frame corresponding to a stored video. The current frame may be an input video frame in an input video frame sequence. The current frame may be alternatively a video frame obtained after processing an input video frame in an input video frame sequence by using a corresponding processing mode. After an encoding end processes the input video frame by using the corresponding processing mode, a resolution of the obtained video frame to be encoded is less than a resolution of the original input video frame. For example, down-sampling processing may be performed on the input video frame according to a corresponding sampling ratio to obtain the current frame.

Specifically, the encoding end may determine a processing mode of an input video frame, and process the input video frame according to the processing mode of the input video frame, to obtain the current frame. The processing mode includes a down-sampling processing mode and a full-resolution processing mode. In the down-sampling processing mode, an input video frame is down-sampled to obtain the current frame, and the obtained video to be encoded frame is encoded. A down-sampling mode in the down-sampling processing mode may be customized as required, which further includes vertical down-sampling, horizontal down-sampling, and vertical and horizontal down-sampling. Down-sampling may be performed by using algorithms such as a direct average algorithm, a filter algorithm, a bicubic interpolation algorithm, and a bilinear interpolation algorithm. In the full-resolution processing mode, an input video frame is directly used as the current frame, and the current frame is directly encoded based on an original resolution of the input video frame.

Figure 3:
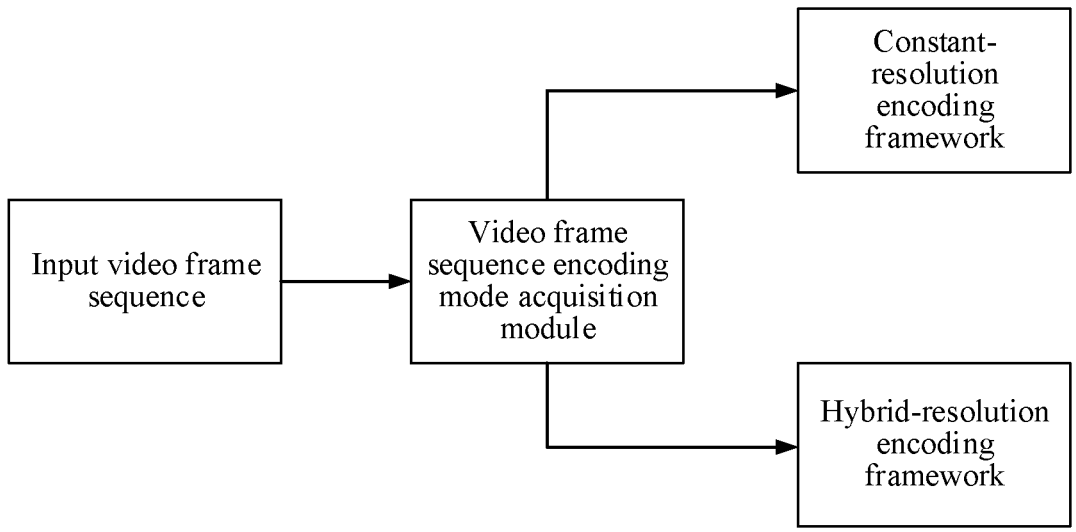
FIG. 3 is a schematic framework diagram of a video encoding framework according to an embodiment.

In an embodiment, the video encoding framework is shown in FIG. 3, and includes a constant-resolution encoding framework and a hybrid-resolution encoding framework. The encoding end may encode an input video frame sequence by using the hybrid-resolution encoding framework or the constant-resolution encoding framework. If the input video frame sequence is encoded using the constant-resolution encoding framework, each input video frame in the input video frame sequence is encoded by using a full-resolution processing mode. The constant-resolution encoding framework may be a HEVC encoding framework, a H.265 encoding framework or the like. If the hybrid-resolution encoding framework shown in FIG. 4 is used to encode an input video frame sequence, each input video frame in the input video frame sequence may be encoded by using either the full-resolution processing mode or the down-sampling processing mode. For example, referring to FIG. 5, in the input video frame sequence, the $N^{th}$ input video frame is encoded using the full-resolution processing mode, the $(N+1)^{th}$ input video frame is encoded using the down-sampling processing mode, and the $(N+2)^{th}$ input video frame is encoded by using the full-resolution processing mode.

FIG. 4 is a schematic diagram of a hybrid-resolution encoding framework according to an embodiment. Referring to FIG. 4, the encoder encodes each frame of the input video in the acquired input video frame sequence to obtain corresponding encoded data, and stores or transmits the encoded data or stores and transmits the encoded data by using a storage/transmission unit 422. At a processing mode decision unit 402, processing mode decision may be performed on an input video frame, to obtain a processing mode corresponding to the input video frame. At a first processing unit 404, the input video frame may be processed according to the processing mode obtained by the processing mode decision unit 402, to obtain a current frame to be encoded from a video input. At a first prediction unit 406, at a resolution of the current frame, it may be determined to perform intra-frame prediction or inter-frame prediction on each encoded block in the current frame, an image value of a reference block of an encoded block is obtained to obtain a corresponding predicted value and a corresponding motion vector, and subtraction is performed on an actual value of the encoded block and the predicted value to obtain a prediction residual. The value of the motion vector may be a displacement of the encoded block relative to the reference block. At a transformation unit 408, the prediction residual and data of the motion vector are transformed from a spatial domain to a frequency domain, and a transformation coefficient may be encoded. A transformation method may include discrete Fourier transform, discrete cosine transform, and the like. At a quantization unit 410, the transformed data is mapped into another value. For example, the transformed data is divided by a quantization step to obtain a relatively small value. A quantization parameter is a sequence number corresponding to the quantization step, and a corresponding quantization step may be found according to the quantization parameter. A small quantization parameter indicates reservation of most details of an image frame and a high corresponding bit rate. A large quantization parameter indicates a low corresponding bit rate, relatively large image distortion, and low image quality. An entropy encoding unit 420 is configured to perform entropy encoding. The entropy encoding is a data encoding mode according to an entropy principle without loss of any information, and particular information can be expressed by using a relatively small quantity of characters. An entropy encoding method may be, for example, a Shannon encoding method or a Huffman encoding method.

A first inverse quantization unit 412, a first inverse transformation unit 414, a first reconstruction unit 416, and a first reference information adaptation unit 418 are units corresponding to path reconstruction. The units for path reconstruction are used to perform frame reconstruction to obtain a reference frame, so that reference frames can be kept consistent in encoding and decoding. Steps performed by the first inverse quantization unit 412 are an inverse process of quantization. Steps performed by the first inverse transformation unit 414 are an inverse process of transformation performed by the transformation unit 408. The first reconstruction unit 416 is configured to add residual data obtained through inverse transformation to predicted data to obtain a reconstructed reference frame. The first reference information adaptation unit 418 is configured to perform adaptive processing on at least one piece of reference information such as a reconstructed reference frame, position information corresponding to each encoded block in the current frame, position information corresponding to each reference block in the reference frame, and a motion vector at a resolution of the current frame, to enable the first prediction unit 406 to perform prediction according to the reference information obtained after the adaptive processing.

In an embodiment, the encoding end may further add encoding framework information corresponding to an encoding framework used in encoding of an input video frame sequence to encoded data corresponding to the input video frame sequence. An addition position of the encoding framework information in the encoded data may be determined according to an effect range of the encoding framework. Specifically, the encoding framework information may be added to sequence header information corresponding to the encoded data, and is used for informing a decoding end of an encoding framework used in encoding of each input video frame in the input video frame sequence corresponding to the current encoded data, each input video frame in the input video frame sequence using the same encoding framework. For example, if a flag bit Sequence_Mix_Flag used for determining the used encoding framework in the sequence header information of the encoded data is 0, it indicates that all the input video frames in the input video frame sequence are encoded by using the constant-resolution encoding framework. If Sequence_Mix_Flag is 1, it indicates that all the input video frames in the input video frame sequence are encoded by using an adaptive-resolution encoding framework, so that the decoding end may decode the encoded data according to a decoding framework corresponding to the encoding framework to obtain a reconstructed video frame sequence.

In an embodiment, a processing mode corresponding to the input video frame may be set according to practical considerations. For example, a processing parameter corresponding to the input video frame may be acquired, and a corresponding processing mode is obtained according to the processing parameter. The processing parameter is a parameter used for determining a processing mode. A specific processing mode may be set and adjusted as required. For example, the processing parameter may include current encoding information and/or image feature information corresponding to the input video frame. The processing mode may be adjusted dynamically for a video frame sequence.

In an embodiment, the encoding end may obtain a processing mode corresponding to the input video frame according to at least one of the current encoding information and the image feature information corresponding to the input video frame. The current encoding information is obtained video compression parameter information such as one or more of a frame type, a motion vector, a quantization parameter, a video source, a bit rate, a frame rate, and a resolution of a video during encoding. The image feature information is information related to image content, and includes one or more of image motion information and image texture information, for example, an edge. The current encoding information and the image feature information reflect a scene, detail complexity, motion intensity or the like that corresponds to a video frame. For example, a motion scene may be determined by using one or more of a motion vector, a quantization parameter, and a bit rate. A large quantization parameter usually indicates intense motion, and a large motion vector indicates that an image scene is a large motion scene.

The encoding end may also perform determination according to a ratio of a bit rate of an encoded I frame (Intra-coded frame) to that of an encoded P frame (Predicted frame) or a ratio of the bit rate of the encoded I frame to that of an encoded B frame (Bi-directional predicted frame). If the proportion exceeds a first preset threshold, it is determined that an image is a still image. If the proportion is less than a second preset threshold, it may be determined that an image is an intense motion image. Alternatively, a target object is directly tracked according to image content, and it is determined according to a motion speed of the target object whether a scene is a large motion scene. A fixed bit rate indicates a fixed amount of information that can be expressed. For an intense motion scene, an amount of information in a time domain is large, and accordingly, a bit rate that can be used for expressing information in a spatial domain is small. Therefore, a relatively desirable image quality effect can be achieved by using a low resolution, and a down-sampling mode is more likely to be selected for encoding. A picture switching scenario may be determined according to a frame prediction type, or an encoding mode that is likely to be selected may be determined according to the impact of the frame prediction type on other frames. For example, an I frame is usually the first frame or there is picture switching, and the quality of the I frame affects the quality of a subsequent P frame or B frame. Therefore, compared with inter prediction, a full resolution encoding is more likely to be selected for intra prediction, to ensure image quality. The P frame may be used as the reference frame of the B frame, and image quality of the P frame affects image quality of the subsequent B frame. Therefore, a full resolution encoding is more likely to be selected for encoding with the P frame compared with encoding with the B frame.

Texture complexity of a current frame to be encoded is determined according to the image feature information, for example, image texture information. If texture is complex and includes a large number of details, there is a large amount of image spatial domain information. If down-sampling is performed, a relatively large amount of detail information may be lost due to the down-sampling, and video quality is affected. Therefore, a full resolution is more likely to be selected for a current video frame having a complex texture for encoding compared with that having simple texture.

In an embodiment, the encoding end may obtain a processing mode corresponding to the input video frame according to a value relationship between a current quantization parameter corresponding to the input video frame and a quantization parameter threshold. If the current quantization parameter is greater than the quantization parameter threshold, it is determined that the processing mode is a down-sampling mode, or otherwise, it is determined that the processing mode is a full-resolution mode. The quantization parameter threshold may be obtained according to a proportion of intra-frame encoded blocks in an encoded forward encoding video frame before an input video frame, and a correspondence between a proportion of intra-frame prediction blocks and a quantization parameter threshold may be preset, so that after a proportion of intra-frame prediction blocks in a current frame is determined, a quantization parameter threshold corresponding to the proportion of intra-frame prediction blocks in the current frame may be determined according to the correspondence. For constant-quantization parameter encoding, the current quantization parameter may be a corresponding constant quantization parameter value. For constant-bit rate encoding, a current quantization parameter corresponding to an input video frame may be calculated according to a bit rate control model. Alternatively, a quantization parameter corresponding to a reference frame may be used as a current quantization parameter corresponding to the input video frame. In this embodiment of the present application, a larger current quantization parameter usually indicates higher motion intensity, and the down-sampling mode is more likely to be selected for encoding in an intense motion scenario.

In an embodiment, the encoding end may further calculate a proportion of encoded blocks of a target prediction type in a forward encoding video frame corresponding to an input video frame, and a processing mode corresponding to the input video frame is determined according to the proportion.

Specifically, an encoded block of a prediction type is an encoded block corresponding to a frame prediction type. A proportion of the target prediction type may a proportion corresponding to intra-frame encoded blocks, or a proportion corresponding to inter-frame encoded blocks, or both. The proportion of the encoded blocks of the target prediction type in the forward encoding video frame corresponding to the input video frame may be a proportion of the encoded blocks of the target prediction type to encoded blocks of other prediction types or may be a proportion of encoded blocks of the type to a total quantity of encoded blocks. This may be specifically set as required. For example, a first quantity of intra-frame encoded blocks in the forward encoding video frame and a second quantity of inter-frame encoded blocks in the forward encoding video frame may be acquired. A proportion of the intra-frame encoded blocks to the inter-frame encoded blocks is calculated according to the first quantity and the second quantity. Alternatively, a third quantity of all encoded blocks in the forward encoding video frame is calculated, and a proportion of the intra-frame encoded blocks to a third data amount is calculated according to the first quantity and the third quantity. A proportion of the inter-frame encoded blocks to the third data amount may further be calculated according to the second quantity and the third quantity.

The forward encoding video frame is an encoded video frame encoded before a current frame from an input video is encoded. A plurality of acquired forward encoding video frames may be customized. For example, the forward encoding video frame may be one previous encoded video frame of the input video frame, or the forward encoding video frame may be three previous encoded video frames of the input video frame. After a proportion corresponding to encoded blocks of a target prediction type in a forward encoding video frame is calculated, a processing mode corresponding to the input video frame is determined according to the calculated proportion. If a plurality of forward encoding video frames are acquired, corresponding proportions of encoded blocks of different types in each forward encoding video frame may be calculated, weighted calculation is performed on the proportions to obtain a total proportion, and a target processing mode corresponding to the input video frame is then determined according to the total proportion and a preset threshold. A weight corresponding to the forward encoding video frame may be inversely correlated to an encoding distance between the forward encoding video frame and the input video frame.

In an embodiment, the encoding end may calculate a ratio of intra-frame encoded blocks in the forward encoding video frame. If the ratio is greater than a target threshold, it is determined that the processing mode is a down-sampling processing mode.

For the ratio corresponding to the intra-frame encoded blocks, if the ratio is greater than the target threshold, it may be determined that the target processing mode corresponding to the input video frame is a down-sampling resolution mode, or otherwise, it is determined that the target processing mode corresponding to the video frame is a full-resolution mode. For example, if the ratio is greater than the target threshold, it is determined that the processing mode corresponding to the input video frame is a down-sampling resolution mode, or otherwise, it is determined that the target processing mode corresponding to the video frame is a full-resolution mode.

In this embodiment of the present application, if a ratio of intra-frame encoded blocks is large, it indicates that the video is relatively complex or there is relatively low correlation between video frames. Therefore, the obtained prediction residual is relatively large. Therefore, the down-sampling processing mode is more likely to be used for encoding, thereby reducing an amount of encoded data.

The target threshold may be determined according to a processing mode of a reference frame corresponding to the current frame from an input video. If the processing mode of the reference frame corresponding to the current frame is a down-sampling mode, the encoder may select a first preset threshold T1, and use the first preset threshold T1 as the target threshold. Similarly, if the processing mode of the reference frame corresponding to the current frame is a full-resolution mode, the encoder may select a second preset threshold T2, and use the second preset threshold T2 as the target threshold. Further, after selecting the target threshold according to resolution information of the reference frame corresponding to the current video frame, the encoder determines a processing mode of the current video frame according to the target threshold and the ratio of intra-frame encoded blocks in the forward encoding video frame. If the ratio of intra-frame encoded blocks in the forward encoding video frame is greater than the target threshold, it is determined that the processing mode corresponding to the input video frame is the down-sampling processing mode.

In an embodiment, the second preset threshold is greater than the first preset threshold. In this case, if the processing mode corresponding to the reference frame is a full-resolution processing mode, the full-resolution processing mode is more likely to be used for the input video frame. If the processing mode corresponding to the reference frame is a down-sampling processing mode, the down-sampling processing mode is more likely to be used for the input video frame.

In an embodiment, if an adaptive-resolution encoding framework is used to encode the input video frame, the encoding end may further add processing mode information corresponding to a processing mode used in encoding of the input video frame to the encoded data corresponding to the input video frame. Specifically, the processing mode information may be added to frame header information corresponding to the encoded data, and is used for informing the decoding end of a processing mode used in encoding of the input video frame corresponding to the current encoded data. For example, if a flag bit Frame_Resolution_Flag used for determining a processing mode in the frame header information of the encoded data is 0, it indicates that the input video frame is encoded by using the full-resolution processing mode. Or if Frame_Resolution_Flag is 1, it indicates that the input video frame is encoded by using the down-sampling processing mode. The decoding end may decode the encoded data by using the corresponding processing mode to obtain a reconstructed video frame.

In an embodiment, the encoding end may further acquire a processing parameter corresponding to the input video frame, and determine a processing mode corresponding to the input video frame according to the processing parameter. If the processing parameter cannot recur in a decoding process, processing mode information corresponding to the processing mode is added to the encoded data corresponding to the input video frame.

Specifically, for example, the processing parameter may include at least one of image encoding information and image feature information corresponding to the input video frame. Processing parameter cannot recur in the decoding process meaning that the processing parameter cannot be obtained or generated in the decoding process. For example, if the processing parameter is information corresponding to image content of the input video frame and there is a loss of image information during an encoding process, the decoded video frame corresponding to the input video frame in the decoding process may be different from the input video frame. Therefore, information corresponding to the image content of the input video frame may not be obtained or decoded from the decoding process. That is, the information corresponding to the image content cannot recur in the decoding process. A rate-distortion cost needs to be calculated in the encoding process, and a rate-distortion cost is not calculated in the decoding process. If the processing parameter includes a rate-distortion cost, the processing parameter cannot recur in the decoding process. The reconstructed video frame obtained in the encoding process and peak signal to noise ratio (PSNR) information of the input video frame cannot be obtained in the decoding process. Therefore, the PSNR information cannot recur in the decoding process.

In an embodiment, if the processing parameter can recur at the decoding end, the encoding end may add processing mode information corresponding to the processing mode to the encoded data corresponding to the input video frame or the processing mode information corresponding to the processing mode may not be added to the encoded data corresponding to the input video frame. If the processing mode information corresponding to the processing mode is added to the encoded data corresponding to the input video frame, the decoding end may read processing mode information from the encoded data, and it is no longer necessary to obtain the processing mode according to processed data. If the processing mode information corresponding to the processing mode is not added to the encoded data corresponding to the input video frame, a decoding device determines a processing mode according to a processing parameter, so that the data amount of the encoded data can be reduced.

In an embodiment, if down-sampling processing is performed on an input video frame by using the down-sampling processing mode, to obtain a current frame, the encoding end may obtain a specific down-sampling ratio according to a capability of a processor of a device such as a terminal or server that performs the video encoding method. A device having a processor with a high processing capability corresponds to a large down-sampling ratio, and a device having a processor with a low processing capability corresponds to a small down-sampling ratio. A correspondence between a processing capability of a processor and a down-sampling ratio may be set. If encoding is required, a processing capability of a processor is acquired, and a corresponding down-sampling ratio is obtained according to the processing capability of the processor. For example, it may be set that a down-sampling ratio corresponding to a 16-bit processor is 1/8, and a down-sampling ratio corresponding to a 32-bit processor is 1/4.

In an embodiment, the down-sampling ratio may further be obtained according to a frequency or a quantity of times of using an input video frame as a reference frame. The encoding end may set a correspondence between a down-sampling ratio and a frequency or a quantity of times of using an input video frame as a reference frame. If the frequency of using an input video frame as a reference frame is high or the quantity of times of using an input video frame as a reference frame is large, the down-sampling ratio is large. If the frequency of using an input video frame as a reference frame is low or the quantity of times of using an input video frame as a reference frame is small, the down-sampling ratio is small. For example, if a frequency of using an I frame as a reference frame is high, a corresponding down-sampling ratio is large, and may be, for example, 1/2. For example, if a frequency of using a P frame as a reference frame is low, a corresponding down-sampling ratio is small, and may be, for example, 1/4. A down-sampling ratio is obtained according to the frequency or quantity of times of using an input video frame as a reference frame. If the frequency of using an input video frame as a reference frame is high or the quantity of times of using an input video frame as a reference frame is large, image quality is relatively high. Therefore, the accuracy of prediction can be improved, the prediction residual can be reduced, and the quality of an encoded image can be improved.

In an embodiment, if the encoding end performs down-sampling processing on an input video frame by using the down-sampling processing mode to obtain a current frame, a specific down-sampling method may be obtained according to a capability of a processor of a device such as a terminal or server that performs the video encoding method. A device having a processor with a high processing capability corresponds to a complex down-sampling method, and a device having a processor with a low processing capability corresponds to a simple down-sampling method. A correspondence between a processing capability of a processor and a down-sampling method may be set. If encoding is required, a processing capability of a processor is acquired, and a corresponding down-sampling method is obtained according to the processing capability of the processor. For example, bicubic interpolation is more complex than bilinear Interpolation. Therefore, it may be set that a down-sampling method corresponding to a 16-bit processor is a bilinear Interpolation method and a down-sampling method corresponding to a 32-bit processor is a bicubic interpolation method.

In this embodiment of the present application, during processing of an input video frame by using the down-sampling processing mode, down-sampling may further be performed according to different down-sampling methods or down-sampling ratios, and a processing mode of an input video frame is more flexible and suitable for the running environment.

In an embodiment, if the encoding end performs down-sampling processing on an input video frame by using the down-sampling processing mode to obtain a current frame, the encoding end may further add at least one of down-sampling method information corresponding to a down-sampling method and down-sampling ratio information corresponding to a down-sampling ratio to the encoded data corresponding to the input video frame.

An addition position of the down-sampling method information in the encoded data may be any one of corresponding sequence header information, group header information, and frame header information. The addition position of the down-sampling method information in the encoded data may be determined according to an effect range corresponding to the down-sampling method. For example, the encoding end may add down-sampling method information to sequence header information of encoded data corresponding to an input video frame sequence, indicating that during encoding of input video frames in the input video frame sequence, down-sampling processing is performed by using the down-sampling method corresponding to the down-sampling method information, and down-sampling ratios are the same, for example, double-width down-sampling and double-height down-sampling, triple-width down-sampling and triple-height down-sampling, or double-width down-sampling and triple-height down-sampling. The encoding end may also add down-sampling method information to group header information of encoded data corresponding to a group of pictures (GOP), indicating that during encoding of input video frames in the GOP, down-sampling processing is performed by using a down-sampling method corresponding to the down-sampling method information. The encoding end may further add down-sampling method information to frame header information of encoded data corresponding to a video frame, indicating that during encoding of input video frames in an input video frame sequence, down-sampling processing is performed according to a down-sampling method corresponding to the down-sampling method information. For example, an effect range of a flag bit Down_Sampling_Method that is added to the frame header information and used for determining down-sampling method information is limited on a frame level, indicating that sampling processing is performed by using a down-sampling method corresponding to down-sampling method information for an input video frame corresponding to the encoded data.

Similarly, an addition position of the down-sampling ratio information in the encoded data may be any one of corresponding sequence header information, group header information, and frame header information. The addition position of the down-sampling ratio information in the encoded data may be determined according to an effect range or scope corresponding to the down-sampling ratio. For example, an effect range of a flag bit Down_Sampling_Scale that is added to the frame header information and is used for determining down-sampling ratio information is limited on a frame level, so that it may be implemented that sampling processing is performed by using different down-sampling ratios for different input video frames, to obtain video frames to be encoded with different resolutions. For example, a down-sampling ratio of the first frame is 1/2, or a down-sampling ratio of the second frame is 1/3.

With a given bit rate, a resolution of a video frame is inversely proportional to a definition. Therefore, adaptive processing may be performed on input video frames according to corresponding processing modes to obtain video frames to be encoded before encoding, so that encoding quality can be improved, and an image definition can be improved. In addition, during processing of the input video frame in the down-sampling processing mode, down-sampling may further be performed according to different down-sampling methods and down-sampling ratios, and a processing mode of an input video frame is more flexible.

The reference frame is a video frame that needs to be referenced during encoding of the current frame. The reference frame is a video frame obtained by reconstructing encoded data corresponding to a video frame that can be used as a reference frame. According to different inter-frame prediction types, the reference frame corresponding to a current video frame to be encoded may be a forward reference frame or a bidirectional reference frame, and there may be one or more reference frames corresponding to the current frame. For example, if the current frame is a P frame, there may be one corresponding reference frame. For example, if the current frame is a B frame, there may be two corresponding reference frames. The reference frame corresponding to the current frame may be obtained according to a reference relationship. There may be different reference relationships according to various video codec standards.

Specifically, after performing intra-frame prediction on an input video frame that can be used as a reference frame to obtain corresponding encoded data, the encoding end may perform entropy decoding, inverse quantization, and inverse transformation on the encoded data to obtain a prediction residual corresponding to each intra-frame prediction block, and then add the prediction residual to corresponding reference blocks in the input video frame to obtain reconstructed video blocks, so as to obtain a reconstructed frame, that is, the reference frame, for example, an I frame, of the input video frame.

Similarly, after performing inter-frame prediction on an input video frame that can be used as a reference frame to obtain corresponding encoded data, the encoding end may perform entropy decoding, inverse quantization, and inverse transformation on the encoded data to obtain a prediction residual corresponding to each inter-frame prediction block, and then add the prediction residual to corresponding reference blocks in the input video frame to obtain reconstructed video blocks, so as to obtain a reconstructed frame, that is, the reference frame, for example, a P frame, of the input video frame.

In an embodiment, the encoding end may buffer every reference frame corresponding to the input video frame sequence, and establish a correspondence between a current frame and a reference frame. The encoding end may directly acquire a corresponding reference frame during encoding of a current frame from the buffer. The encoding end may further acquire resolution information corresponding to the reference frame.

In an embodiment, step S202 of acquiring a reference frame corresponding to a current frame includes: acquiring a first reference rule, the first reference rule including a resolution value relationship between the current frame and the reference frame; and acquiring the reference frame corresponding to the current frame according to the first reference rule.

Specifically, the first reference rule determines a resolution value limit relationship between a current frame and a reference frame. The resolution value relationship includes at least one of the current frame and the reference frame having the same resolution or different resolutions. If the first reference rule includes that the current frame and the reference frame have the same resolution, the first reference rule may further include a processing mode reference rule of the resolutions of the current frame and the reference frame. For example, the processing mode reference rule may include one or two of that a reference frame using a full-resolution processing mode may be referenced for a current frame using the full-resolution processing mode and a reference frame using the down-sampling processing mode may be referenced for a current frame using the down-sampling processing mode. If the first reference rule includes that the current frame and the reference frame have different resolutions, the first reference rule may further include one or two of that a resolution of the current frame is greater than a resolution of the reference frame and the resolution of the current frame is less than the resolution of the reference frame. The first reference rule may include one or more of that a reference frame with a down-sampled resolution may be referenced for a current frame with an original resolution, a reference frame with an original resolution may be referenced for a current frame with a down-sampled resolution, a reference frame with an original resolution may be referenced for a current frame with an original resolution, and a reference frame with a down-sampled resolution may be referenced for a current frame with a down-sampled resolution. The current frame with an original resolution means that a resolution of the current frame is the same as that of a corresponding input video frame, and the reference frame with an original resolution means that a resolution of the reference frame is the same as that of an input video frame corresponding to the reference frame. The current frame with a down-sampled resolution means that the current frame is obtained by performing down-sampling processing on a corresponding input video frame. The reference frame with a down-sampled resolution means that the reference frame is obtained by performing down-sampling processing on a corresponding reference frame. After the first reference rule is obtained, the reference frame corresponding to the current frame is obtained according to the first reference rule. Therefore, the obtained reference frame satisfies the first reference rule.

In an embodiment, during encoding of the current frame, the encoding end may further add rule information corresponding to the first reference rule to the encoded data corresponding to the current frame.

Specifically, the rule information is used for describing the used first reference rule. The encoding end may add a flag bit Resolution_Referencer_Rules describing the processing mode to the encoded data. A specific value of the flag bit may be set as required. An addition position of the rule information in the encoded data may be one or more of corresponding group header information, sequence header information, and frame header information. The addition position of the rule information in the encoded data may be determined according to an effect range of a first processing reference rule. For example, if the first reference rule is that a reference frame with a down-sampled resolution may be referenced for a current frame with an original resolution, corresponding Resolution_Referencer_Rules may be 1. If the first reference rule is that a reference frame with a down-sampled resolution may be referenced for a current frame with a down-sampled resolution, corresponding Resolution_Referencer_Rules may be 2. If the same first reference rule is used for a video frame sequence, an addition position of the rule information in the encoded data may be sequence header information. If different first reference rules may be used for GOPs in the video frame sequence, an addition position of the rule information in the encoded data may be group header information.

S204: Determine a sub-pixel interpolation mode, the sub-pixel interpolation mode comprising one of a direct sub-pixel interpolation mode and a sampled sub-pixel interpolation mode.

Sub-pixel interpolation is a process of performing interpolation by using reference data of a whole pixel (also referred to as complete pixel) in a reference frame to obtain reference data on a sub-pixel level. For example, FIG. 6(1) and FIG. 6(2) are schematic diagrams of performing interpolation on a reference frame according to an embodiment. Referring to FIG. 6(1), pixels such as A1, A2, A3, B1, B2, and B3 are 2*2 whole pixels in the reference frame. Reference data of sub-pixels are calculated according to reference data of these whole pixels. For example, an average may be obtained according to the reference data of the three whole pixels A1, A2, and A3 to calculate reference data of a sub-pixel a23, an average may be obtained according to the reference data of the three whole pixels A2, B2, and C2 to calculate reference data of a sub-pixel a21, and reference data of a sub-pixel a22 is then calculated according to the reference data of the sub-pixels a23 and a21, to implement interpolation with 1/2 pixel precision on the reference frame. Referring to FIG. 6(2), pixels such as A1, A2, A3, B1, B2, and B3 are 4*4 whole pixels in the reference frame. Reference data of 15 sub-pixels is calculated according to reference data of these whole pixels, to implement interpolation with 1/4 pixel precision on the reference frame. For example, reference data of a sub-pixel a8 is calculated according to the reference data of the whole pixels A2 and B2, and reference data of a sub-pixel a2 is calculated according to the reference data of the whole pixels A2 and A3. Similarly, reference data of a total of 15 sub-pixels a1 to a15 is calculated, to implement interpolation with 1/4 pixel precision on the whole pixel A2. In the encoding process of the current frame, the encoding end needs to search the reference frame for a reference block corresponding to an encoded block in the current frame by using a motion search technology, a motion vector is calculated according to motion information of the encoded block relative to the reference block, and the motion vector is encoded to inform the decoding end of the position of the reference data corresponding to the reference block in the reference frame. Therefore, sub-pixel interpolation processing is performed on the reference frame to obtain a target reference frame, and motion estimation may be performed on the current frame according to the target reference frame with a higher resolution, so that the accuracy of motion estimation is improved and encoding quality is improved.

The sub-pixel interpolation mode is a mode of performing sub-pixel interpolation processing on the acquired reference frame, including directly performing sub-pixel interpolation processing on the reference frame and performing sub-pixel interpolation processing after performing sampling processing on the reference frame.

Specifically, if the reference frame and the current frame have the same resolution, the encoding end may directly perform sub-pixel interpolation processing on the reference frame. If the reference frame and the current frame have different resolutions, the encoding end may directly perform sub-pixel interpolation processing on the reference frame or may sample the reference frame to obtain a frame with a resolution the same as that of the current frame, and then perform sub-pixel interpolation processing on the obtained frame with the same resolution. The two sub-pixel interpolation modes are applicable. The sampling of the current reference frame includes up-sampling processing and down-sampling processing. In an embodiment, if there are a plurality of reference frames, each reference frame is sampled to obtain a frame having a resolution the same as that of the current frame.

In this embodiment, the reference frame is sampled to obtain a frame having a resolution the same as that of the current frame, so that an image matching degree between the current frame and the to-be-referenced frame can be somewhat improved, thereby improving the accuracy of inter-frame prediction, reducing the prediction residual, and improving the quality of an encoded image.

In an embodiment, the encoding end and the decoding end may set in respective codec rules sub-pixel interpolation modes used during processing of the reference frame to obtain a target reference frame. The used sub-pixel interpolation modes are recommended to be consistent. Corresponding sub-pixel interpolation modes of processing the reference frame are determined according to configurations during encoding and decoding.

In an embodiment, if an adaptive-resolution encoding framework is used to encode an input video frame, the encoding end may further add sub-pixel interpolation mode information corresponding to the sub-pixel interpolation mode to encoded data corresponding to the current frame. The encoding end may add the sub-pixel interpolation mode information to header information of the encoded data corresponding to the current frame. Optionally, an addition position (that is, the header information) of the sub-pixel interpolation mode information in the encoded data may be any one of sequence header information, group header information, and frame header information of the encoded data corresponding to the current frame. The addition position of the sub-pixel interpolation mode information in the encoded data may be determined according to an effect range corresponding to the sub-pixel interpolation mode. For example, the encoding end may add the sub-pixel interpolation mode information to the frame header information of the encoded data corresponding to the input video frame, indicating that during encoding of the input video frame, sub-pixel interpolation processing is performed on the corresponding reference frame by using the sub-pixel interpolation mode corresponding to the sub-pixel interpolation mode information. For example, if the flag bit Pixel_Sourse_Interpolation used for determining the sub-pixel interpolation mode in the frame header information of the encoded data is 0, it indicates that sub-pixel interpolation processing is directly performed on the reference frame corresponding to the input video frame. If Pixel_Sourse_Interpolation is 1, it indicates that sampling processing is performed on the reference frame corresponding to the input video frame before sub-pixel interpolation processing is performed. The decoding end may perform sub-pixel interpolation processing on the reference frame by using the sub-pixel interpolation mode indicated by the flag bit in the encoded data to obtain a target reference frame, so that the encoded data may be decoded according to the target reference frame to obtain a reconstructed video frame.

For example, if a reference frame referenced for a current video frame to be encoded with a down-sampled resolution is a reconstructed frame with an original high resolution, a sequence header information syntax element (that is, the foregoing flag bit Pixel_Sourse_Interpolation used for determining a sub-pixel interpolation mode) may be defined for indicating whether a sub-pixel interpolation frame referenced for the current video frame to be encoded is obtained by directly performing sub-pixel interpolation on a reconstructed frame with an original high resolution (that is, Pixel_Sourse_Interpolation is 0) or is obtained by down-sampling the reconstructed frame with an original high resolution to the down-sampled resolution (a resolution the same as that of the current video frame to be encoded) and then performing sub-pixel interpolation (that is, Pixel_Sourse_Interpolation is 1). The sequence header information syntax element may be an element on a sequence level, a video frame group level or a frame level.

For example, the sequence header information syntax element may be shown in the following Table 1.

TABLE 1

XXX header added information {
Pixel_Sourse_Interpolation
}

The XXX header added information shown in the foregoing Table 1 may be header information of a video frame group or may be header information on a single-frame level.

S206: Process the reference frame according to resolution information of the current frame by using the sub-pixel interpolation mode, to obtain a corresponding target reference frame.

The resolution information of the current frame may be a resolution of the current frame or may be down-sampling ratio information corresponding to the current frame obtained by performing down-sampling processing on the input video frame. For example, the resolutions of input video frames are all 2M*2N. Down-sampling processing is performed on the input video frame to obtain a current frame with a resolution of M*N, so that the resolution information may be a resolution of M*N of the current frame or may be down-sampling ratio information, that is, 1/2. For another example, the processing mode corresponding to the current frame is a full-resolution processing mode, that is, the input video frame is directly used as the current frame. In this case, the resolution information may be a resolution of 2M*2N of the current frame or may be down-sampling ratio information, that is, 1.

The target reference frame is a video frame obtained after sub-pixel interpolation processing is performed on the reference frame according to a corresponding sub-pixel interpolation mode. Specifically, the encoding end may determine a sampling method corresponding to the used sub-pixel interpolation mode according to a proportional relationship between a resolution indicated by the resolution information of the current frame and a resolution indicated by the resolution information of the reference frame, the sampling method including an up-sampling method or a down-sampling method.

In an embodiment, the encoding end may determine a ratio for sampling the reference frame according to the proportional relationship between the resolution of the current frame and a resolution of the reference frame. For example, the resolutions of input video frames are all 2M*2N. A current input video frame is processed by using the full-resolution processing mode. That is, the current input video frame is directly used as the current frame to be encoded. The resolution of the current frame is 2M*2N. An input video frame that can be used as a reference frame is processed by using the down-sampling processing mode, to obtain that a resolution of the down-sampled reference frame to be encoded is M*2N. The resolution of a reconstructed corresponding reference frame is also M*2N. In this case, it is determined that up-sampling processing is performed on the reference frame by using a sampling ratio of the double width and the same height, to obtain a frame with a resolution the same as that of the current frame. If the encoding end performs processing on the current input video frame by using the down-sampling processing mode, the resolution of a down-sampled video frame to be encoded is M*N. An input video frame that can be used as a reference frame is processed by using the full-resolution processing mode. In this case, the resolution of the reconstructed reference frame is 2M*2N. It is determined that down-sampling processing is performed on the reference frame by using a sampling ratio of a width of 1/2 and a height of 1/2, to obtain a frame with a resolution the same as that of the current frame.

In an embodiment, because input video frames generally have the same resolution, the encoding end may determine a proportion for sampling the reference frame according to a down-sampling ratio corresponding to a current frame obtained by down-sampling an input video frame and a down-sampling ratio corresponding to a reference frame to be encoded obtained by down-sampling an input video frame that can be used as a reference frame. For example, down-sampling processing is performed on the input video frame by using a sampling ratio of 1/2 to obtain a current frame, and down-sampling processing is performed on an input video frame that can be used as a reference frame by using a sampling ratio of 1/4 to obtain a reference frame to be encoded. In this way, a down-sampling ratio corresponding to the reference frame reconstructed according to the encoded data of the reference frame to be encoded is also 1/4. In this case, according to a multiple relationship between the two down-sampling ratios, it may be determined that up-sampling processing is performed on the reference frame by using a sampling ratio of 2 to obtain a frame with a resolution the same as that of the current frame.

In an embodiment, a sampling method for sampling the reference frame by the encoding end matches a sampling algorithm of down-sampling the input video frame to obtain the current frame. That is, if the reference frame needs to be down-sampled, a down-sampling algorithm is the same as the down-sampling algorithm of down-sampling the input video frame to obtain the current frame. If the reference frame needs to be up-sampled, an up-sampling algorithm is an inverse sampling algorithm matching the down-sampling algorithm of down-sampling the input video frame to obtain the current video frame to be encoded.

In this embodiment, the sampling algorithm for sampling the reference frame matches the sampling algorithm by which the current frame is down-sampled to obtain the current encoded video frame, to further increase an image matching degree between the reference frame and the current encoded video frame, thereby further improving the accuracy of inter-frame prediction, reducing the prediction residual, and improving the quality of an encoded image.

S208: Encode the current frame according to the target reference frame, to obtain encoded data corresponding to the current frame.

Specifically, the encoding may include at least one of prediction, transformation, quantization, and entropy encoding. If the current frame is a P frame or a B frame, the encoding end may acquire the reference frame corresponding to the current frame, perform prediction according to the reference frame to obtain a prediction residual, and perform transformation, quantization, entropy encoding, and the like on the prediction residual to obtain encoded data corresponding to the input video frame. In the process of obtaining the encoded data, at least one of position information and a motion vector corresponding to each encoding block in the reference frame and the current frame is processed according to the resolution of the current frame. For example, during the calculation of the prediction residual, the encoding end may process the reference frame according to the resolution information of the current frame, to obtain the target reference frame, acquire a reference block corresponding to each encoded block in the current frame from the target reference frame, perform prediction according to the reference block, to obtain a predicted value corresponding to the encoded block, and then obtain a prediction residual according to a difference between an actual value and the predicted value of the encoded block. As the encoding end calculates a target motion vector, if the resolution of the reference frame is different from the resolution of the current frame, the encoding end may transform the position information of the encoded block or the position information of the decoded block according to the resolutions of the reference frame and the current frame, and obtain the target motion vector according to the transformed position information, to reduce the value of the target motion vector, thereby reducing a data amount of the encoded data. Alternatively, if resolution information corresponding to the target motion vector is different from the resolution information of the current frame, during the calculation of a first motion vector corresponding to an encoded block in the current frame, the first motion vector is transformed according to the resolution information of the current frame and the resolution information corresponding to the target motion vector, to obtain the target motion vector. For example, assuming that the resolution of the current frame is 400*800 pixels, and the resolution of the reference frame is 800*1600 pixels. 1/2 down-sampling may be performed on the reference frame according to the resolution of the current frame, to obtain that the resolution of the target reference frame is 400*800 pixels, and video encoding is performed according to the target reference frame. If resolution information corresponding to the current frame is different from the resolution information corresponding to the reference frame, the position information of the encoded block corresponding to the current frame is transformed, to obtain a transformed position.

In an embodiment, the encoding end may further add corresponding sampling mode information for processing the reference frame to encoded data corresponding to the reference frame. The encoding end may further acquire a corresponding encoding mode during encoding of the current frame, and add encoding mode information corresponding to the encoding mode to the encoded data corresponding to the input video frame.

Specifically, the encoding mode is a processing mode related to encoding by the encoding end. For example, one or more up-sampling modes used for a video frame obtained after the reference frame is decoded and reconstructed during encoding, a rule corresponding to a reference rule, and sub-pixel interpolation of the reference frame. The encoding mode information corresponding to the encoding mode is added to the encoded data corresponding to the input video frame, so that the decoding end may decode a current frame according to the encoding mode information.

In an embodiment, the encoding end may not add the encoding mode information corresponding to the encoding mode to the encoded data. Instead, an encoding mode is preset at the encoding end, and a decoding mode corresponding to the encoding mode is set at the decoding end. Alternatively, the encoding end and the decoding end may calculate the corresponding encoding mode and decoding mode according to the same algorithm or corresponding algorithms. For example, it may be preset in a codec standard that the up-sampling method of the reference frame by the encoding end is the same as the up-sampling method of the reference frame by the decoding end.

By using the foregoing video encoding method, after a reference frame corresponding to a current frame is acquired, a sub-pixel interpolation mode of the reference frame may be determined, and the reference frame is processed according to resolution information of the reference frame by using the sub-pixel interpolation mode, to adjust a resolution of the reference frame, to obtain a target reference frame. Even if the resolution of the reference frame is different from that of the current frame, the reference frame may be used as a reference frame for the current frame. The current frame is encoded according to the obtained target reference frame, thereby improving the utilization efficiency of reference frames, so that the accuracy of inter-frame prediction can be improved, a prediction residual can be reduced, and the quality of an encoded image can be improved.

As shown in FIG. 7, in an embodiment, step S206 of processing the reference frame according to resolution information of the current frame by using the sub-pixel interpolation mode, to obtain a corresponding target reference frame specifically includes the following steps.

S702: Acquire motion estimation pixel precision corresponding to the current frame.

The motion estimation pixel precision is a unit length of a motion vector corresponding to an encoded block in the current frame. If the encoding end encodes an encoded block in the current frame, the unit length of the motion vector corresponding to the encoded block may be subdivided according to the acquired motion estimation pixel precision. In this way, the obtained motion vector is more precise and accurate. The encoding end needs to perform sub-pixel interpolation processing on the reference frame according to the acquired motion estimation pixel precision to obtain a target reference frame, then calculate a motion vector corresponding to each encoded block in the current frame according to the target reference frame, and perform encoding based on the motion vector to obtain the encoded data corresponding to the current frame.

S704: Process the reference frame according to the resolution information of the current frame and the motion estimation pixel precision by using the sub-pixel interpolation mode, to obtain the corresponding target reference frame.

Specifically, the encoding end may acquire the resolution information of the reference frame, and determine, according to the sub-pixel interpolation mode used for the current frame, the resolution information of the current frame, the resolution information of the reference frame, and the motion estimation pixel precision corresponding to the current frame, which sampling processing is to be used for the reference frame, a sampling ratio corresponding to the sampling processing, and pixel interpolation precision.

In an embodiment, the motion estimation pixel precision is generally 1/2 pixel precision, 1/4 pixel precision or 1/8 pixel precision. Motion estimation with higher precision may not significantly improve the encoding quality, but causes significant increase in calculation complexity.

In an embodiment, the encoding end may configure corresponding motion estimation pixel precision for the current frame according to image feature information of the current frame. The image feature information is, for example, the size, texture information, motion speed, and the like of the current frame, and various types of image feature information may be combined to determine the motion estimation pixel precision corresponding to the current frame. If image data carried in the current frame is more complex and image information is richer, the corresponding motion estimation pixel precision is higher. For example, during inter-frame prediction of a P frame, relatively high motion estimation pixel precision may be used to calculate motion vectors corresponding to encoded blocks in the P frame. During inter-frame prediction of a B frame, relatively low motion estimation pixel precision may be used to calculate motion vectors corresponding to encoded blocks in the B frame.

As shown in FIG. 8, in an embodiment, step S704 of processing the reference frame according to the resolution information of the current frame to be encoded and the motion estimation pixel precision by using the sub-pixel interpolation mode, to obtain the corresponding target reference frame includes the following steps.

S802: If the sub-pixel interpolation mode is a sampled sub-pixel interpolation mode and a resolution indicated by the resolution information of the current frame is less than a resolution of the reference frame, perform down-sampling processing on the reference frame according to the resolution information of the current frame to obtain an intermediate reference frame.

Specifically, if the sub-pixel interpolation mode corresponding to the current frame is a sampled sub-pixel interpolation mode, it indicates that sampling processing needs to be performed first on the reference frame to obtain an intermediate reference frame with a resolution the same as that of the current frame, and sub-pixel interpolation processing is then performed on the intermediate reference frame to obtain the corresponding target reference frame.

S804: Perform sub-pixel interpolation processing on the intermediate reference frame according to the motion estimation pixel precision, to obtain the corresponding target reference frame.

As discussed above, if a resolution indicated by the resolution information of the current frame is less than a resolution of the reference frame, the encoding end needs to determine a sampling ratio of performing down-sampling on the reference frame according to the proportional relationship between the two resolutions, and perform down-sampling according to the sampling ratio to obtain an intermediate reference frame with a resolution the same as that of the current frame; and then perform sub-pixel interpolation processing on the intermediate reference frame based on the motion estimation pixel precision, to obtain the target reference frame. In addition, in this case, the pixel interpolation precision is the same as the motion estimation pixel precision.

For example, the encoding end performs down-sampling processing on an input video frame with a resolution of 2M*2N by using the down-sampling processing mode to obtain a current frame with a resolution of M*N. The resolution of the reference frame is 2M*2N (the full-resolution processing mode). Down-sampling processing is performed on the reference frame according to a sampling ratio of 1/2 to obtain an intermediate reference frame with a resolution of M*N. If the motion estimation pixel precision corresponding to the acquired video frame to be encoded is 1/2, sub-pixel interpolation processing is then performed on the intermediate reference frame according to pixel interpolation precision the same as the motion estimation pixel precision, that is, sub-pixel interpolation precision of 1/2, to obtain the target reference frame. If the motion estimation pixel precision corresponding to the acquired video frame to be encoded is 1/4, sub-pixel interpolation processing is performed on the intermediate reference frame according to the sub-pixel interpolation precision of 1/4, to obtain a target reference frame with a higher resolution.

Certainly, the reference frame may also be obtained using the down-sampling processing mode. For example, the encoding end performs down-sampling processing on the input video frame with a resolution of 2M*2N according to the down-sampling processing mode to obtain a current frame with a resolution of 1/2M*1/2N. The reference frame is obtained through reconstruction after down-sampling processing is performed on an input video frame with a resolution of 2M*2N to obtain encoded data corresponding to a reference frame to be encoded with a resolution of M*N. In this case, the resolution of the reference frame is also M*N. Therefore, the resolution of the current frame is less than a resolution of the reference frame. Down-sampling processing may be performed on the reference frame according to a sampling ratio of 1/2 to obtain an intermediate reference frame with a resolution the same as that of the current frame. Sub-pixel interpolation processing is then performed based on the motion estimation pixel precision to obtain the target reference frame.

Figure 9:
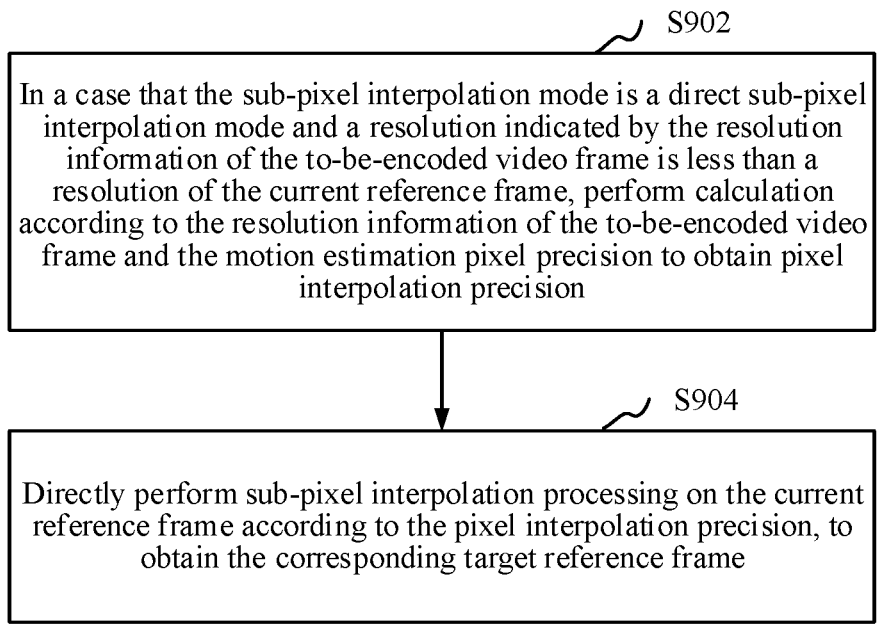
FIG. 9 is a schematic flowchart of processing a reference frame according to resolution information of a video frame and motion estimation pixel precision by using a sub-pixel interpolation to obtain a corresponding target reference frame according to another embodiment.

As shown in FIG. 9, in an embodiment, step S704 of processing the reference frame according to the resolution information of the current frame to be encoded and the motion estimation pixel precision by using the sub-pixel interpolation mode, to obtain the corresponding target reference frame includes the following steps.

S902: If the sub-pixel interpolation mode is a direct sub-pixel interpolation mode and a resolution indicated by the resolution information of the current frame is less than a resolution of the reference frame, perform calculation according to the resolution information of the current frame and the motion estimation pixel precision to obtain pixel interpolation precision.

S904: Directly perform sub-pixel interpolation processing on the reference frame according to the pixel interpolation precision, to obtain the corresponding target reference frame.

Specifically, if the sub-pixel interpolation mode corresponding to the current frame is a direct sub-pixel interpolation mode, it indicates that sub-pixel interpolation processing may be directly performed on the reference frame to obtain the target reference frame. It may be understood that because the resolution of the reference frame is greater than the resolution of the current frame, data of some sub-pixels in the reference frame may be directly reused, and may be used as data corresponding to sub-pixels corresponding to the motion estimation pixel precision.

For example, the resolution of the current frame is M*N, and the resolution of the reference frame is 2M*2N. If the motion estimation pixel precision is 1/2, the reference frame may be directly used as the target reference frame. If the motion estimation pixel precision is 1/4, it is calculated that the pixel interpolation precision is 1/2, and sub-pixel interpolation processing may be performed on the reference frame by using pixel interpolation precision of 1/2 to obtain the target reference frame.

Figure 10:
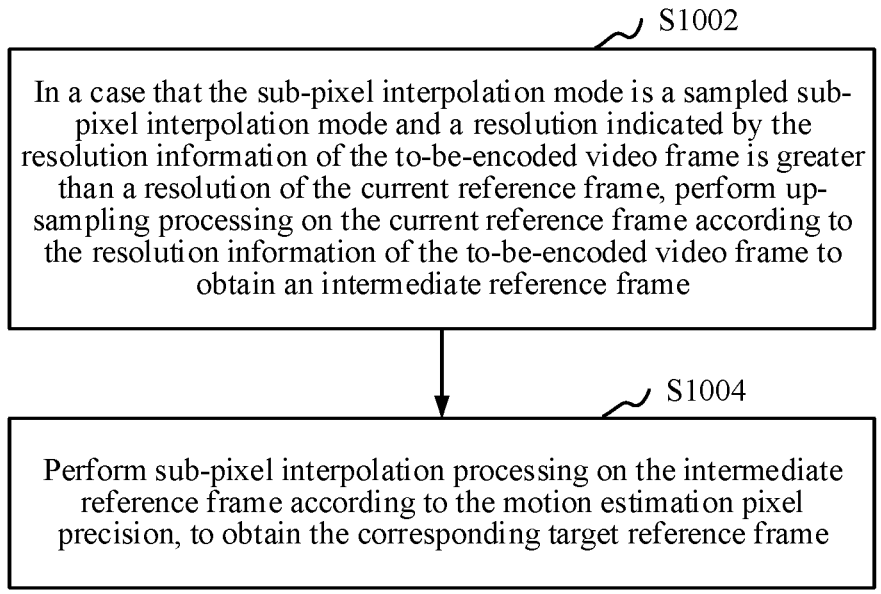
FIG. 10 is a schematic flowchart of processing a reference frame according to resolution information of a video frame and motion estimation pixel precision by using a sub-pixel interpolation to obtain a corresponding target reference frame according to still another embodiment.

As shown in FIG. 10, in an embodiment, step S704 of processing the reference frame according to the resolution information of the current frame to be encoded and the motion estimation pixel precision by using the sub-pixel interpolation mode, to obtain the corresponding target reference frame includes the following steps.

S1002: If the sub-pixel interpolation mode is a sampled sub-pixel interpolation mode and a resolution indicated by the resolution information of the current frame is greater than a resolution of the reference frame, perform up-sampling processing on the reference frame according to the resolution information of the current frame to obtain an intermediate reference frame.

S1004: Perform sub-pixel interpolation processing on the intermediate reference frame according to the motion estimation pixel precision, to obtain the corresponding target reference frame.

As discussed above, if the resolution of the current frame is greater than a resolution of the reference frame, the encoding end needs to perform up-sampling processing on the reference frame to obtain an intermediate reference frame with a resolution the same as that of the current frame; and then perform sub-pixel interpolation processing on the intermediate reference frame based on the motion estimation pixel precision corresponding to the current frame, to obtain the target reference frame.

For example, the resolution of the current frame is 2M*2N, and the resolution of the reference frame is 1/2M*1/2N. Up-sampling processing needs to be performed on the reference frame according to a sampling ratio of 1/4 to obtain an intermediate reference frame with a resolution the same as that of the current frame. If the motion estimation pixel precision is 1/2, sub-pixel interpolation processing continues to be performed on the obtained intermediate reference frame according to the pixel interpolation precision of 1/2, to obtain the target reference frame. If the motion estimation pixel precision is 1/4, sub-pixel interpolation processing continues to be performed on the obtained intermediate reference frame according to the pixel interpolation precision of 1/4, to obtain the target reference frame.

In an embodiment, the processing the reference frame according to the resolution information of the current frame and the motion estimation pixel precision by using the sub-pixel interpolation mode, to obtain the corresponding target reference frame includes: if the sub-pixel interpolation mode is a direct sub-pixel interpolation mode and a resolution indicated by the resolution information of the current frame is the same as a resolution of the reference frame, directly performing sub-pixel interpolation processing on the reference frame according to the motion estimation pixel precision, to obtain the corresponding target reference frame.

Specifically, the input video frame is processed by using the full-resolution processing mode to obtain the current frame, and if the resolution of the reference frame is also the original resolution, the resolution of the current frame is the same as the resolution of the reference frame. Alternatively, the input video frame is processed by using the down-sampling mode to obtain the current frame, and if the reference frame is also reconstructed through encoded data obtained by performing encoding using the down-sampling mode with the same sampling ratio, the resolution of the current frame is the same as the resolution of the reference frame. In this case, the encoding end may directly perform sub-pixel interpolation processing on the reference frame based on the motion estimation pixel precision to obtain the target reference frame, and the pixel interpolation precision corresponding to the sub-pixel interpolation processing is the same as the motion estimation pixel precision.

In the foregoing embodiment, sub-pixel interpolation processing is performed on the reference frame, so that the resolution of the reference frame is higher. In this way, the calculated video frame to be encoded is more precise than the motion vector of the reference frame, thereby further reducing a prediction residual, so that encoding quality can be improved.

Figure 11:
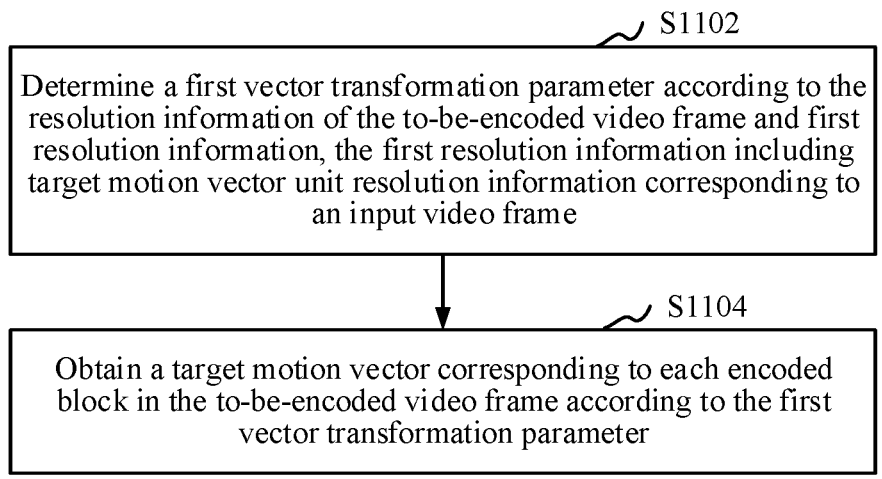
FIG. 11 is a schematic flowchart of encoding a video frame according to a target reference frame, to obtain encoded data corresponding to the video frame according to an embodiment.

In an embodiment, as shown in FIG. 11, step S208 of encoding the current frame according to the target reference frame, to obtain encoded data corresponding to the current frame includes the following steps.

S1102: Determine a first vector transformation parameter according to the resolution information of the current frame to be encoded and first resolution information, the first resolution information including target motion vector unit resolution information corresponding to an input video frame.

Specifically, the first vector transformation parameter is used for transforming a motion vector or position information of the motion vector, to obtain a transformed motion vector or position. The resolution information is information related to a resolution, and may be, for example, a resolution or a down-sampling ratio. The first vector transformation parameter may be a ratio of the resolution information of the current frame to the first resolution information and may be obtained by dividing the resolution information of the current frame by the first resolution information, or may be obtained by dividing the first resolution information by the resolution information of the current frame, or may be obtained by multiplying the proportion by a corresponding coefficient or adding a preset offset to the proportion after the proportion is obtained. For example, assuming that the down-sampling ratio of the reference frame is 1/3, the down-sampling ratio of the current frame is 1/6. The first vector transformation parameter may be 2 obtained by dividing 1/3 by 1/6.

S1104: Obtain a target motion vector corresponding to each encoded block in the current frame according to the first vector transformation parameter.

Specifically, after obtaining the first vector transformation parameter, the encoding end transforms the obtained motion vector or the position information corresponding to the motion vector according to the first vector transformation parameter, to obtain the target motion vector.

In an embodiment, step S1102 of determining a first vector transformation parameter according to the resolution information of the current frame and first resolution information includes: acquiring the target motion vector unit resolution information; and determining the first vector transformation parameter according to the resolution information of the current frame and the target motion vector unit resolution information.

Specifically, the target motion vector unit resolution information is information related to a resolution corresponding to the unit of the target motion vector, and may be, for example, a resolution or a down-sampling ratio. The resolution corresponding to the unit of the target motion vector means that the unit of the target motion vector is calculated by using the vector unit at the resolution as a standard. The resolutions of some video frames to be encoded corresponding to an input video frame sequence may be the same as the original resolution of the input video frame, and the resolutions of some other video frames to be encoded are less than the original resolution of the input video frame. That is, the video frames to be encoded may have one or more resolutions. Therefore, the resolution corresponding to the unit of the target motion vector needs to be determined. The resolution corresponding to the unit of the target motion vector may be set before encoding or obtained according to a parameter of an encoding process, and may be specifically set as required.

In an embodiment, the resolution corresponding to the unit of the target motion vector may be a resolution corresponding to the input video frame, that is, the original resolution. Alternatively, the resolution corresponding to the unit of the target motion vector may be a resolution corresponding to the current frame. The first vector transformation parameter may be a ratio of resolution information corresponding to the unit of the target motion vector to the resolution information of the current frame. For example, assuming that the resolution corresponding to the unit of the target motion vector is the original resolution, the sampling ratio corresponding to the unit of the target motion vector is 1, and the sampling ratio of the resolution of the current frame is 1/2, the first vector transformation parameter may be 2 obtained by dividing 1 by 1/2. Alternatively, assuming that the resolution corresponding to the unit of the target motion vector is the original resolution and is 900*900 pixels, and the sampling ratio of the resolution of the current frame is 450*600 pixels, there may be two first vector transformation parameters, namely, a first vector transformation parameter in a horizontal direction and a first vector transformation parameter in a vertical direction. The first vector transformation parameter in the horizontal direction is 900/450=2, and the first vector transformation parameter in the vertical direction is 900/600=1.5.

In an embodiment, the encoding end may obtain the target motion vector unit resolution information according to a computing capability of a device that performs encoding. For example, the operation time is long if the device that performs encoding can only perform operation on an integer or if the computation on a decimal value consume a lot of time. In this case, the resolution corresponding to the unit of the target motion vector may be a resolution corresponding to the input video frame. If the device that performs encoding performs operation on a decimal value fast, the resolution corresponding to the unit of the target motion vector may be a resolution corresponding to the current frame.

In an embodiment, if the first vector transformation parameter is determined according to the resolution information of the current frame and the target motion vector unit resolution information, step S1104 of obtaining a target motion vector corresponding to each encoded block in the current frame according to the first vector transformation parameter includes: obtaining a first motion vector according to displacements of a current encoded block and a corresponding target reference block; and obtaining a target motion vector corresponding to the current encoded block according to the first vector transformation parameter and the first motion vector.

Specifically, the first motion vector is obtained according to the displacements of the current encoded block and the corresponding target reference block, and the target reference block may be acquired from the target reference frame obtained after the reference frame is processed. After the first motion vector is obtained, the first vector transformation parameter may be multiplied by the first motion vector, and the obtained product is used as the target motion vector. Assuming that the resolution corresponding to the unit of the target motion vector is the original resolution, because the unit of the target motion vector is the original resolution and the first motion vector is obtained through calculation at the resolution of the current frame, the first motion vector needs to be transformed. If the first vector transformation parameter is equal to 2, the obtained first motion vector is (2, 2), then the target motion vector is (4, 4). After the target motion vector is obtained, encoding may be performed according to the target motion vector. For example, the target motion vector and the prediction residual corresponding to the current encoded block may be encoded to obtain the encoded data.

In an embodiment, if the resolution information of the current frame is consistent with the target motion vector unit resolution information, the first vector transformation parameter is 1, and the first motion vector is the same as the target motion vector. In this case, step S1102 may be skipped, and the first motion vector is used as the target motion vector. If the resolution information of the current frame is not consistent with the target motion vector unit resolution information, step S1102 is performed.

In an embodiment, if the resolution information of the current frame is different from that of the target reference frame, the step of obtaining the first motion vector includes: determining a third vector transformation parameter according to the resolution information of the current frame and resolution information of the target reference frame; and obtaining the first motion vector corresponding to each encoded block in the current frame according to the third vector transformation parameter.

In an embodiment, the obtaining the first motion vector corresponding to each encoded block in the current frame according to the third vector transformation parameter includes: acquiring first position information corresponding to the current encoded block, and acquiring second position information corresponding to the target reference block corresponding to the current encoded block; and calculating the first motion vector corresponding to the current encoded block according to the third vector transformation parameter, the first position information, and the second position information.

Specifically, the current encoded block is an encoded block that currently requires predicted encoding in the input video frame. The target reference block is an image block used for performing predicted encoding on the current encoded block in the target reference frame. The first position information corresponding to the current encoded block may be represented by coordinates of a pixel. The first position information corresponding to the current encoded block may include coordinates corresponding to all pixels of the current encoded block. The first position information corresponding to the current encoded block may alternatively include coordinates of one or more pixels of the current encoded block. The first position information corresponding to the current encoded block may include coordinates corresponding to all pixels of the current encoded block. The first position information corresponding to the current encoded block may alternatively include coordinates of one or more pixels of the current encoded block. The second position information corresponding to the target reference block may include coordinates corresponding to all pixels of the target reference block. The second position information corresponding to the target reference block may alternatively include coordinates of one or more pixels of the target reference block. For example, the coordinates of the first pixel of a current image block may be used as a coordinate value of the current encoded block, and the coordinates of the first pixel of the target reference block are used as a coordinate value of the target reference block.

The encoding end may transform the first position information by using the third vector transformation parameter to obtain corresponding first transformed position information, and a first motion vector is obtained according to a difference between the first transformed position information and the second position information. Alternatively, the encoding end may transform the second position information by using the third vector transformation parameter to obtain corresponding second transformed position information, and a first motion vector is obtained according to a difference between the first position information and the transformed second position information.

In an embodiment, the third vector transformation parameter is a proportion obtained by dividing high resolution information by low resolution information in the resolution information of the current frame and the resolution information of the target reference frame. A resolution corresponding to the high resolution information is greater than a resolution corresponding to the low resolution information. The third vector transformation parameter is used for transforming position information of the frame with the low resolution information in the current frame and the target reference frame. For example, the resolution of the current frame is 1200*1200 pixels, and the resolution of the target reference frame is 600*600 pixels, so that the high resolution is 1200*1200 pixels, and the low resolution is 600*600 pixels. The first vector transformation parameter may be 2. Assuming that the first position information is (6, 8) and the second position information is (3, 3). The first motion vector is (6, 8)−(3*2, 3*2)=(0, 2). In this embodiment of the present application, the position information corresponding to the frame with the low resolution information is transformed, so that the value of the first motion vector can be reduced, thereby reducing a data amount of encoded data.

In this embodiment of the present application, the resolution corresponding to the unit of the first motion vector is the resolution corresponding to the input video frame, that is, the original resolution. For an input video frame sequence with the same resolution, units of the target motion vectors corresponding to the input video frames are consistent, so that the continuity of the target motion vector can be kept. If the resolution corresponding to the unit of the target motion vector is the resolution corresponding to the current frame, because the resolution information of the current frame is consistent with the target motion vector unit resolution information, it is not necessary to transform the first motion vector, so that a calculation time can be reduced.

Figure 12:
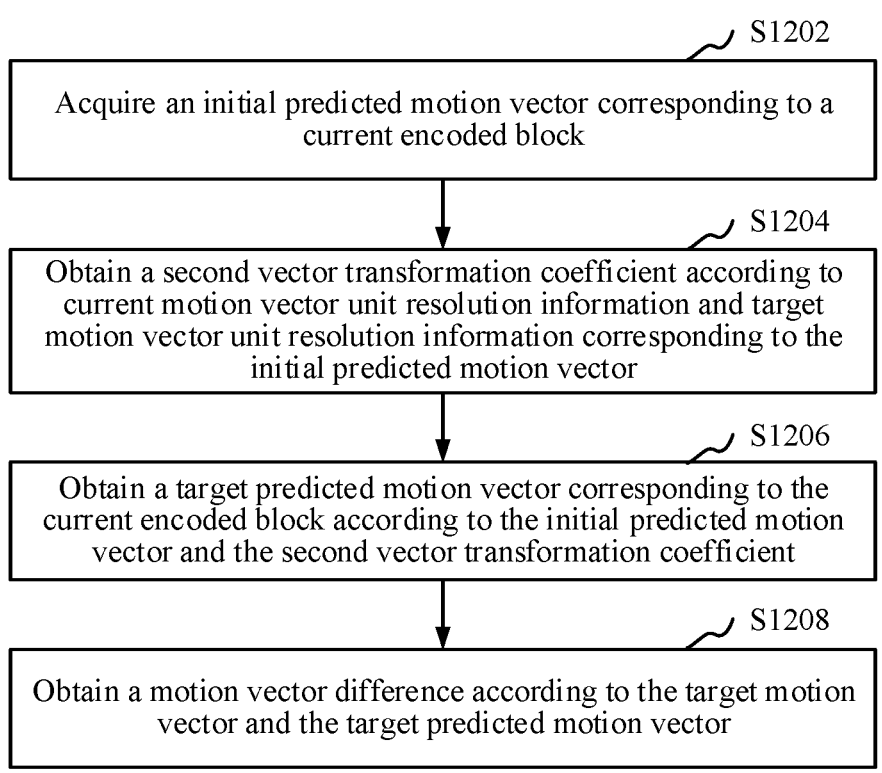
FIG. 12 is a schematic flowchart of encoding a video frame according to a target reference frame, to obtain encoded data corresponding to the video frame according to another embodiment.

In an embodiment, as shown in FIG. 12, step S208 of encoding the current frame according to the target reference frame, to obtain encoded data corresponding to the current frame includes the following steps.

S1202: Acquire an initial predicted motion vector corresponding to a current encoded block.

Specifically, to reduce a quantity of bits for the encoded data, the encoding end may predict the motion vector of the current encoded block to obtain a predicted value, calculate a difference between the target motion vector and the predicted value, to obtain a motion vector difference, and encode the motion vector difference. The initial predicted motion vector is used for predicting the motion vector of the current encoded block. There may be one or more initial predicted motion vectors. This may be specifically set as required. An acquisition rule of the initial predicted motion vector may be set as required. Because the current encoded block is usually spatially correlated to an adjacent encoded block thereof. Therefore, a target motion vector value corresponding to one or more adjacent encoded blocks corresponding to the current encoded block may be used as the initial predicted motion vector. For example, a first motion vector value corresponding to adjacent encoded blocks on the upper right corner and the upper left corner in the current encoded block may be used as the initial predicted motion vector.

S1204: Obtain a second vector transformation coefficient according to current motion vector unit resolution information and target motion vector unit resolution information corresponding to the initial predicted motion vector.

Specifically, the current motion vector unit resolution information is information related to the resolution corresponding to the unit of the target motion vector, and may be, for example, a resolution or a down-sampling ratio. The resolution corresponding to the unit of the initial predicted motion vector means that the unit of the initial predicted motion vector is calculated by using the vector unit at the resolution as a standard. If the current motion vector unit resolution information corresponding to the initial predicted motion vector is different from the target motion vector unit resolution information, the encoding end needs to obtain a second vector transformation coefficient according to the current motion vector unit resolution information and the target motion vector unit resolution information corresponding to the initial predicted motion vector. The first vector transformation parameter may be a proportion of resolution information corresponding to the unit of the target motion vector to the current motion vector unit resolution information. For example, assuming that the resolution corresponding to the unit of the target motion vector is 200*200 pixels, and the current motion vector unit resolution information is 100*100 pixels, the first vector transformation parameter may be 2.

S1206: Obtain a target predicted motion vector corresponding to the current encoded block according to the initial predicted motion vector and the second vector transformation coefficient.

Specifically, after the second vector transformation coefficient is obtained, operation is performed according to the initial predicted motion vector and the second vector transformation coefficient, to obtain the target predicted motion vector. For example, if there is one initial predicted motion vector, a product of the initial predicted motion vector and the second vector transformation coefficient may be used as the target predicted motion vector. If there are a plurality of initial predicted motion vectors, the encoding end may calculate the initial predicted motion vector to obtain a calculation result, and obtain the target motion vector according to the calculation result and the second vector transformation coefficient. The calculation result may be one or more of a minimum value, an average value, and a median value in the initial predicted motion vectors. It may be understood that an algorithm for obtaining the target predicted motion vector according to the initial predicted motion vector and the second vector transformation coefficient may be customized, and a matching customized algorithm may be used at the decoding end to calculate the same target predicted motion vector.

S1208: Obtain a motion vector difference according to the target motion vector and the target predicted motion vector.

Specifically, a difference between the target motion vector and the target predicted motion vector may be used as the motion vector difference, to perform encoding according to the motion vector difference to obtain the encoded data, thereby reducing a data amount of the encoded data.

Figure 13:
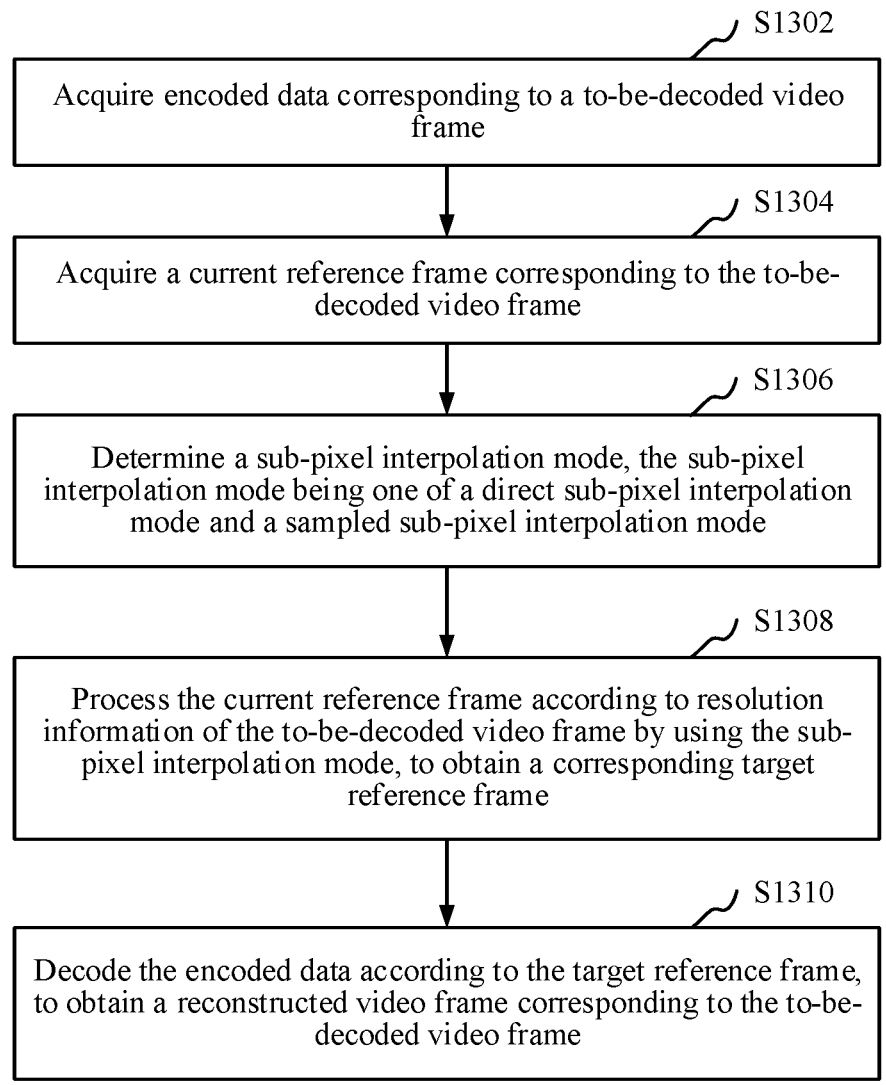
FIG. 13 is a schematic flowchart of a video decoding method according to an embodiment.

In an embodiment, as shown in FIG. 13, a video decoding method is provided. An example in which the method is applied to the terminal 110 or server 120 in the application environment shown in FIG. 1 is used for description, and the method includes the following steps.

S1302: Acquire encoded data corresponding to a current frame to be decoded from a video input.

The current frame is a video frame that needs to be decoded, and the encoded data is data for decoding. The decoding end may receive, through a network, the encoded data transmitted by the encoding end. The encoded data may be obtained by encoding the input video frame by using a full-resolution processing mode by the encoding end or may be obtained after the encoding end performs down-sampling on the input video frame by using a corresponding down-sampling processing mode and then performs encoding.

In an embodiment, the decoding end may acquire processing mode information corresponding to the current frame from header information of the encoded data. After obtaining a reconstructed video frame corresponding to the current frame, the decoding end may process the reconstructed video frame by using a mode matching the processing mode information, to obtain a decoded video frame. Specifically, the header information may be frame header information of the encoded data, indicating a processing mode used in encoding of the input video frame corresponding to the current encoded data. For example, if a flag bit Frame_Resolution_Flag used for determining a processing mode in frame header information of the encoded data is 0, it indicates that the input video frame is encoded by using the full-resolution processing mode, and the reconstructed video frame obtained by decoding the encoded data by the decoding end is a decoded video frame corresponding to the current frame. If Frame_Resolution_Flag is 1, it indicates that the input video frame is encoded by using the down-sampling processing mode. The decoding end may further process the obtained reconstructed video frame by using the processing mode matching the down-sampling processing mode, to obtain the decoded video frame. The further processing is, for example, up-sampling processing.

In an embodiment, the decoding end may determine a decoding framework corresponding to the current frame from the header information of the encoded data. Specifically, the decoding end may acquire an encoding framework used for each input video frame in the input video frame sequence corresponding to the current encoded data during encoding, so as to determine a decoding framework of the current frame matching the encoding framework. For example, if a flag bit Sequence_Mix_Flag used for determining the used encoding framework in the sequence header information of the encoded data is 0, it indicates that all the input video frames in the input video frame sequence are encoded by using the constant-resolution encoding framework, and the decoding end may decode the encoded data by using a constant-resolution decoding framework to obtain a reconstructed video frame corresponding to the current frame. If Sequence_Mix_Flag is 1, it indicates that all the input video frames in the input video frame sequence are encoded by using an adaptive-resolution encoding framework, so that the decoding end may decode the encoded data by using an adaptive-resolution decoding framework to obtain a reconstructed video frame sequence.

Figure 14:
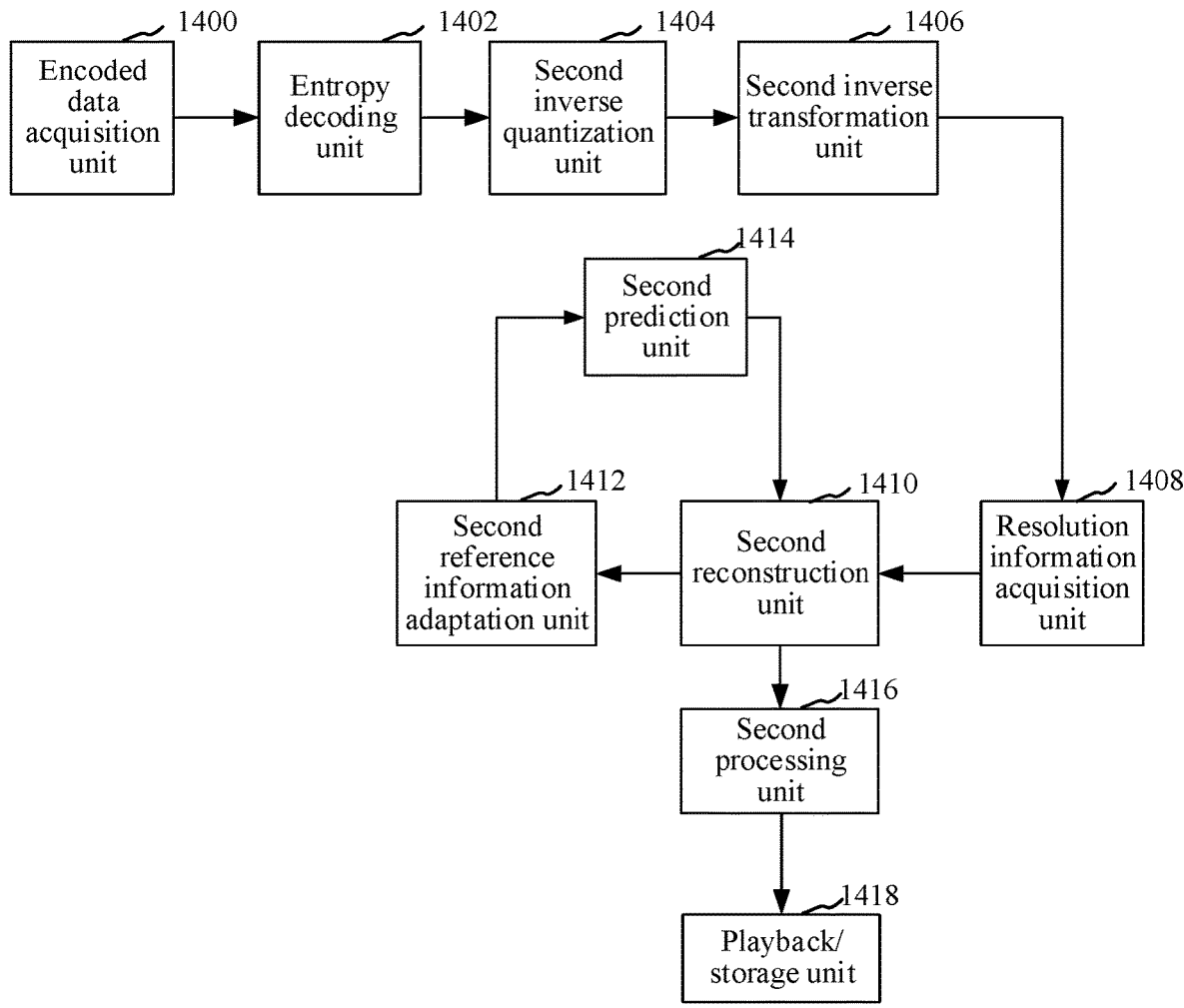
FIG. 14 is a schematic diagram of a hybrid-resolution decoding framework according to an embodiment.

FIG. 14 is a diagram showing a decoding framework corresponding to a video decoding method according to an embodiment. By using the video decoding method provided in this embodiment of this application, an encoded data acquisition unit 1400 may acquire encoded data corresponding to each frame to be decoded in a frame sequence. An entropy decoding unit 1402 performs entropy decoding to obtain entropy decoded data. A second inverse quantization unit 1404 performs inverse quantization on the entropy decoded data to obtain inversely quantized data. A second inverse transformation unit 1406 performs inverse transformation on the inversely quantized data to obtain inversely transformed data. The inversely transformed data may be consistent with the data obtained after the first inverse transformation unit 414 in FIG. 4 performs inverse transformation. A second reference information adaptation unit 1412 is configured to: acquire a reference frame reconstructed by a second reconstruction unit 1410, perform adaptive processing on at least one of reference information such as the reference frame, position information corresponding to each video block to be decoded in a video frame to be decoded, position information corresponding to each reference block in the reference frame, and a motion vector according to resolution information of the current frame, and perform prediction according to information obtained after adaptive processing. A second prediction unit 1414 acquires a reference block corresponding to the video block to be decoded according to reference information obtained after adaptive processing, and obtains a predicted value consistent with the predicted value in FIG. 4 according to an image value of the reference block. The second reconstruction unit 1410 performs reconstruction according to the predicted value and the inversely transformed data (that is, a prediction residual), to obtain a reconstructed video frame. A second processing unit 1416 performs processing on the reconstructed video frame according to resolution information corresponding to the current frame, to obtain a corresponding decoded video frame. A playback/storage unit 1418 may play or store the decoded video frame or play and store the decoded video frame.

In an embodiment, if the decoding end decodes the encoded data by using the adaptive-resolution decoding framework, the decoding end may further determine a processing mode corresponding to the current encoded data according to a decision algorithm. The decision algorithm matches a decision algorithm used by the encoding end to encode the input video frame.

In an embodiment, if the current encoded data determined by the decoding end from the header information of the encoded data is obtained through encoding using the down-sampling processing mode, the decoding end may further acquire the used down-sampling ratio information or down-sampling method information from the header information, and perform up-sampling processing on the obtained reconstructed video frame using an up-sampling ratio matching the down-sampling ratio information or an up-sampling method matching the down-sampling method information, to obtain a decoded video frame. For example, the sampling ratio corresponding to the down-sampling ratio information is 1/2. The decoding end needs to perform up-sampling processing on the reconstructed video frame according to the sampling ratio of 1/2 and the up-sampling method matching the down-sampling method information, to obtain a decoded video frame. The decoding end may acquire the down-sampling ratio information or the down-sampling method information corresponding to the current encoded data from any one of sequence header information, group header information, and frame header information.

S1304: Acquire a reference frame corresponding to the current frame to be decoded.

The reference frame is a video frame that needs to be referenced during decoding of the current frame. The reference frame is a video frame obtained by reconstructing encoded data corresponding to a video frame that can be used as a reference frame. According to different inter-frame prediction types, the reference frame corresponding to a current video frame to be encoded may be a forward reference frame or a bidirectional reference frame, and there may be one or more reference frames corresponding to the current frame. The reference frame in the video decoding method corresponds to the reference frame in the video encoding method.

Specifically, after acquiring the encoded data corresponding to the reference frame, the decoding end may perform entropy decoding, inverse quantization, and inverse transformation on the encoded data to obtain a prediction residual corresponding to each intra-frame prediction block, and then add the prediction residual to corresponding reference blocks to obtain reconstructed video blocks, so as to obtain a reconstructed frame, that is, the reference frame, for example, an I frame, of the input video frame.

In an embodiment, the decoding end may buffer reference frames corresponding to the current frame, and establish a correspondence between a current frame and a reference frame. A corresponding reference frame may be directly acquired during decoding of the current frame. Resolution information corresponding to the reference frame may further be acquired. For example, for one GOP, one same previous reference frame usually needs to be referenced for a plurality of subsequent video frames to be decoded.

In an embodiment, step S1304 of acquiring a reference frame corresponding to the current frame specifically includes: acquiring a second reference rule, the second reference rule including a resolution value relationship between the current frame and the reference frame; and acquiring the reference frame corresponding to the current frame according to the second reference rule.

Specifically, the second reference rule determines a resolution value limit relationship between the current frame and the reference frame. It may be understood that to ensure that the reference frame acquired in the encoding process is consistent with the reference frame acquired in the decoding process, the first reference rule is consistent with the second reference rule. The first reference rule and the second reference rule may be preset in a codec standard. Alternatively, during encoding, the first reference rule may be selected according to an application scenario, a real-time performance requirement and the like of encoding, and reference rule information is carried in the encoded data. A decoder obtains the second reference rule according to the reference rule information in the encoded data. The resolution value relationship includes at least one of the current frame and the reference frame having the same resolution or different resolutions. If the second reference rule includes that the current frame and the reference frame have the same resolution, the second reference rule may further include a processing mode reference rule of the resolutions of the current frame and the reference frame. For example, the processing mode reference rule may include: a reference frame using a full-resolution processing mode may be referenced for a current video frame using a full-resolution processing mode, a reference frame using a down-sampling processing mode may be referenced for a current video frame using a down-sampling processing mode, or both. If the second reference rule includes that the current frame and the reference frame have different resolutions, the second reference rule may further include: a resolution of the current frame is greater than a resolution of the reference frame, a resolution of the current frame is less than a resolution of the reference frame, or both. Therefore, the second reference rule may include one or more of that a reference frame with a down-sampled resolution may be referenced for a current video frame with an original resolution, a reference frame with an original resolution may be referenced for a current frame with a down-sampled resolution, a reference frame with an original resolution may be referenced for a current frame with an original resolution, and a reference frame with a down-sampled resolution may be referenced for a current frame with a down-sampled resolution. The current frame with an original resolution means that a resolution of the current frame is the same as that of a corresponding input video frame, and the reference frame with an original resolution means that a resolution of the reference frame is the same as that of an input video frame corresponding to the reference frame. The current frame with a down-sampled resolution means that the resolution information corresponding to the current frame is down-sampling. The reference frame with a down-sampled resolution is that resolution information corresponding to the reference frame is down-sampling. After the second reference rule is obtained, the reference frame corresponding to the current frame is obtained according to the second reference rule, so that the obtained reference frame satisfies the second reference rule.

S1306: Determine a sub-pixel interpolation mode, the sub-pixel interpolation mode comprising one of a direct sub-pixel interpolation mode and a sampled sub-pixel interpolation mode.

Sub-pixel interpolation is a process of performing interpolation by using reference data of a whole pixel in a reference frame to obtain reference data on a sub-pixel level. In the decoding process of the current frame, the decoding end needs to decode the encoded data to obtain a motion vector, so as to determine a corresponding position of a decoded block in the current frame in the reference frame according to the motion vector, decode the encoded data to obtain a residual, add data at the corresponding position in the reference frame to the residual to obtain data corresponding to the decoded block, so as to obtain a reconstructed video block. Therefore, sub-pixel interpolation processing is performed on the reference frame to obtain the target reference frame, so that a position corresponding to a decoded block in the current frame can be accurately found from the target reference frame with a higher resolution, thereby improving decoding quality.

The sub-pixel interpolation mode is a mode of performing sub-pixel interpolation processing on the acquired reference frame, including directly performing sub-pixel interpolation processing on the reference frame and performing sub-pixel interpolation processing after performing sampling processing on the reference frame.

Specifically, if the reference frame and the current frame have the same resolution, the decoding end may directly perform sub-pixel interpolation processing on the reference frame. If the reference frame and the current frame have different resolutions, the decoding end may perform sub-pixel interpolation processing on the reference frame directly, or may sample the reference frame to obtain a frame with a resolution the same as that of the current frame, and then perform sub-pixel interpolation processing on the obtained frame with the same resolution. The two sub-pixel interpolation modes are applicable. The sampling of the reference frame includes up-sampling processing and down-sampling processing. In an embodiment, if there are a plurality of reference frames, each reference frame is sampled to obtain a frame having a resolution the same as that of the current frame.

In this embodiment, the reference frame is sampled to obtain a frame having a resolution the same as that of the current frame, so that an image matching degree between the current frame and the to-be-referenced frame can be somewhat improved, thereby improving the accuracy of inter-frame prediction, reducing the prediction residual, and improving the quality of an decoded image.

In an embodiment, the encoding end and the decoding end may set in respective codec rules sub-pixel interpolation modes used during processing of the reference frame to obtain a target reference frame. The used sub-pixel interpolation modes are recommended to be consistent. Corresponding sub-pixel interpolation modes of processing the reference frame are determined according to configurations during encoding and decoding.

In an embodiment, the decoding end may further acquire sub-pixel interpolation mode information corresponding to the current frame from the header information of the encoded data corresponding to the current frame. The sub-pixel interpolation mode information is used for indicating a sub-pixel interpolation mode corresponding to the processing of the reference frame. The header information comprises sequence header information, group header information or frame header information of the encoded data corresponding to the current frame. That is, the decoding end may acquire the sub-pixel interpolation mode information corresponding to the current frame from any one of sequence header information, group header information, and frame header information. For example, if the flag bit Pixel_Sourse_Interpolation used for determining the sub-pixel interpolation mode in the frame header information of the encoded data is 0, it indicates that sub-pixel interpolation processing is directly performed on the reference frame corresponding to the input video frame. If Pixel_Sourse_Interpolation is 1, it indicates that sampling processing is performed on the reference frame corresponding to the input video frame before sub-pixel interpolation processing is performed. The decoding end may perform sub-pixel interpolation processing on the reference frame by using a mode the same as the sub-pixel interpolation mode indicated by the flag bit in the encoded data to obtain the target reference frame, so that the encoded data may be decoded according to the target reference frame to obtain a reconstructed video frame.

S1308: Process the reference frame according to resolution information of the current frame using the sub-pixel interpolation mode, to obtain a corresponding target reference frame.

The resolution information of the current frame may be a resolution of the current frame or may be down-sampling ratio information corresponding to the current frame. Because of the correspondence between decoding and encoding, the encoded data corresponding to the current frame is obtained by encoding the current frame. Therefore, the resolution information of the current frame is the same as the resolution information of the current frame. Similarly, the reference frame corresponding to the current frame is the same as the reference frame corresponding to the current frame.

The target reference frame is a video frame obtained after sub-pixel interpolation processing is performed on the reference frame according to a corresponding sub-pixel interpolation mode. Specifically, the decoding end may determine a sampling method corresponding to the used sub-pixel interpolation mode according to a proportional relationship between a resolution indicated by the resolution information of the current frame and a resolution indicated by the resolution information of the reference frame, the sampling method including an up-sampling method or a down-sampling method.

In an embodiment, the decoding end may determine a ratio for sampling the reference frame according to the proportional relationship between the resolution of the current frame and the resolution of the reference frame. For example, if the resolution of the current frame is 2M*2N, and the resolution of the reference frame corresponding to the current frame is M*2N. In this case, it is determined that up-sampling processing is performed on the reference frame by using a sampling ratio of a width of 1/2 and a height of 1, to obtain a frame with a resolution the same as that of the current frame. If the resolution of the current frame is M*N, and the resolution of the reference frame corresponding to the current frame is 2M*2N. It is determined that down-sampling processing is performed on the reference frame using a sampling ratio of a width of 1/2 and a height of 1/2, to obtain a frame with a resolution the same as that of the current frame.

In an embodiment, because input video frames generally have the same resolution, the decoding end may determine a sampling ratio corresponding to the current frame and a sampling ratio for a reference frame corresponding to the current frame based on a down-sampling ratio corresponding to a current frame obtained by down-sampling an input video frame, and a down-sampling ratio corresponding to a reference frame to be encoded obtained by down-sampling an input video frame that can be used as a reference frame. For example, down-sampling processing is performed on the input video frame by using a sampling ratio of 1/2 to obtain a current frame, and a sampling ratio corresponding to the current frame is also 1/2, and down-sampling processing is performed on an input video frame that can be used as a reference frame by using a sampling ratio of 1/4 to obtain a reference frame to be encoded, so that a down-sampling ratio corresponding to a reference frame reconstructed according to the encoded data of the reference frame to be encoded is also 1/4, and a down-sampling ratio corresponding to the reference frame corresponding to the current frame is also 1/4. According to a multiple relationship between the down-sampling ratios of the current frame and the corresponding reference frame, it may be determined that up-sampling processing is performed on the reference frame corresponding to the current frame by using a sampling ratio of 2 to obtain a frame with a resolution the same as that of the current frame.

S1310: Decode the encoded data according to the target reference frame, to obtain a reconstructed video frame corresponding to the current frame.

The reconstructed video frame is a video frame obtained through decoding and reconstruction. It may be understood that resolution information corresponding to the reconstructed video frame corresponds to the resolution information of the current frame in the encoding process. If there is no loss of image information in the encoding process, the reconstructed video frame is the same as the current frame. If there is a loss of image information in the encoding process, a difference between the reconstructed video frame and the current frame corresponds to a loss value. The encoded data is decoded by using the resolution information corresponding to the current frame. The decoding may include at least one of prediction, inverse transformation, inverse quantization, and entropy decoding, and is specifically determined according to the encoding process. During decoding, for example, the reference frame corresponding to the current frame may be acquired. The reference frame is processed according to the resolution information corresponding to the current frame, to obtain the target reference frame. A predicted value corresponding to the current frame is obtained according to the target reference frame, and the reconstructed video frame is obtained according to the prediction residual in the encoded data and the predicted value. If a target reference block corresponding to a current video block to be decoded in the reference frame is obtained according to the motion vector, the motion vector in the encoded data is transformed according to resolution information corresponding to a unit of the motion vector in the encoded data and the resolution information corresponding to the current frame, to obtain a target motion vector, and a target reference block is obtained according to the target motion vector.

Specifically, decoding is performed according to the resolution information corresponding to the current frame during decoding. After the target reference frame is obtained, the reference block corresponding to the encoded block in the current frame may be acquired from the target reference frame. The encoded block is decoded according to the reference block, to obtain the reconstructed video frame corresponding to the current frame.

By using the foregoing video decoding method, after encoded data corresponding to a current frame and a reference frame corresponding to the current frame are acquired, a sub-pixel interpolation mode of the reference frame may be determined, and the reference frame is processed according to resolution information of the reference frame by using the sub-pixel interpolation mode, to adjust a resolution of the reference frame, to obtain a target reference frame. Even if the resolution of the reference frame is different from that of the current frame, the reference frame may be used as a reference frame for the current frame. The current frame is encoded according to the obtained target reference frame, thereby improving the utilization efficiency of reference frames, so that the accuracy of inter-frame prediction can be improved, a prediction residual can be reduced, and the quality of an encoded image can be improved.

Figure 15:
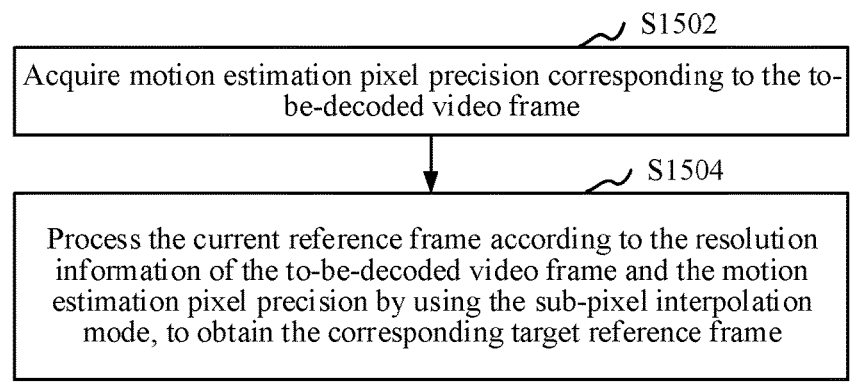
FIG. 15 is a schematic flowchart of processing a reference frame according to resolution information of a current frame by using a sub-pixel interpolation to obtain a corresponding target reference frame according to an embodiment.

As shown in FIG. 15, in an embodiment, step S1308 (found in FIG. 13), processing the reference frame according to resolution information of the current frame by using the sub-pixel interpolation mode, to obtain a corresponding target reference frame includes the following steps.

S1502: Acquire motion estimation pixel precision corresponding to the current frame.

S1504: Process the reference frame according to the resolution information of the current frame and the motion estimation pixel precision by using the sub-pixel interpolation mode, to obtain the corresponding target reference frame.

Specifically, the decoding end may acquire the resolution information of the reference frame, and determine, according to the sub-pixel interpolation mode used for the current frame, the resolution information of the current frame, the resolution information of the reference frame, and the motion estimation pixel precision corresponding to the current frame, what sampling processing is to be used for the reference frame, a sampling ratio corresponding to the sampling processing, and pixel interpolation precision.

In an embodiment, the motion estimation pixel precision is generally 1/2 pixel precision, 1/4 pixel precision, or 1/8 pixel precision. Motion estimation with higher precision cannot significantly improve the encoding quality, but causes significant increase in calculation complexity.

In an embodiment, the decoding end may configure corresponding motion estimation pixel precision for the current frame according to image feature information of the current frame. The image feature information is, for example, the size, texture information, motion speed, and the like of the current frame, and various types of image feature information may be combined to determine the motion estimation pixel precision corresponding to the current frame. If the image data carried in the current frame is more complex and image information is richer, the corresponding motion estimation pixel precision is higher. For example, during inter-frame prediction of a P frame, relatively high motion estimation pixel precision may be used to calculate motion vectors corresponding to encoded blocks in the P frame. During inter-frame prediction of a B frame, relatively low motion estimation pixel precision may be used to calculate motion vectors corresponding to encoded blocks in the B frame.

In an embodiment, step S1504 of processing the reference frame according to the resolution information of the current frame and the motion estimation pixel precision by using the sub-pixel interpolation mode, to obtain the corresponding target reference frame includes: if the sub-pixel interpolation mode is a sampled sub-pixel interpolation mode and a resolution indicated by the resolution information of the current frame is less than a resolution of the reference frame, performing down-sampling processing on the reference frame according to the resolution information of the current frame to obtain an intermediate reference frame, and performing sub-pixel interpolation processing on the intermediate reference frame according to the motion estimation pixel precision, to obtain the corresponding target reference frame.

Specifically, if the sub-pixel interpolation mode corresponding to the current frame is a sampled sub-pixel interpolation mode, it indicates that sampling processing needs to be performed on the reference frame first, to obtain the intermediate reference frame with a resolution the same as that of the current frame, and sub-pixel interpolation processing is then performed on the intermediate reference frame to obtain the corresponding target reference frame.

As discussed above, if a resolution indicated by the resolution information of the current frame is less than a resolution of the reference frame, the decoding end needs to determine a sampling ratio of performing down-sampling on the reference frame according to the proportional relationship between the two resolutions, and perform down-sampling according to the sampling ratio to obtain an intermediate reference frame with a resolution the same as that of the current frame; and then perform sub-pixel interpolation processing on the intermediate reference frame based on the motion estimation pixel precision, to obtain the target reference frame. In addition, in this case, the pixel interpolation precision is the same as the motion estimation pixel precision.

For example, down-sampling processing is performed on an input video frame with a resolution of 2M*2N by using the down-sampling processing mode to obtain a current frame with a resolution of M*N, so that the resolution of the current frame is also M*N. The resolution of the reference frame is 2M*2N (the full-resolution processing mode). Down-sampling processing is performed on the reference frame according to a sampling ratio of 1/2 to obtain an intermediate reference frame with a resolution of M*N. If the motion estimation pixel precision corresponding to the acquired current frame is 1/2, sub-pixel interpolation processing is then performed on the intermediate reference frame according to pixel interpolation precision the same as the motion estimation pixel precision, that is, sub-pixel interpolation precision of 1/2, to obtain the target reference frame. If the motion estimation pixel precision corresponding to the acquired current frame is 1/4, sub-pixel interpolation processing is performed on the intermediate reference frame according to the sub-pixel interpolation precision of 1/4, to obtain the target reference frame with a higher resolution.

Certainly, the reference frame may also be obtained by using the down-sampling processing mode. For example, down-sampling processing is performed on the input video frame with a resolution of 2M*2N according to the down-sampling processing mode to obtain a current frame with a resolution of 1/2M*1/2N, so that the resolution of the current frame is also 1/2M*1/2N. The reference frame is obtained through reconstruction after down-sampling processing is performed on an input video frame with a resolution of 2M*2N to obtain encoded data corresponding to a reference frame to be encoded with a resolution of M*N. In this case, the resolution of the reference frame is also M*N. Therefore, the resolution of the current frame is less than the resolution of the reference frame. Down-sampling processing may be performed on the reference frame according to a sampling ratio of 1/2 to obtain an intermediate reference frame with a resolution the same as that of the current frame. Sub-pixel interpolation processing is then performed based on the motion estimation pixel precision to obtain the target reference frame.

In an embodiment, step S1504 of processing the reference frame according to the resolution information of the current frame and the motion estimation pixel precision by using the sub-pixel interpolation mode, to obtain the corresponding target reference frame includes: if the sub-pixel interpolation mode is a direct sub-pixel interpolation mode and a resolution indicated by the resolution information of the current frame is less than a resolution of the reference frame, calculating the pixel interpolation precision according to the resolution information of the current frame and the motion estimation pixel precision, and directly performing sub-pixel interpolation processing on the reference frame according to the pixel interpolation precision, to obtain the corresponding target reference frame.

Specifically, if the sub-pixel interpolation mode corresponding to the current frame is a direct sub-pixel interpolation mode, it indicates that sub-pixel interpolation processing may be directly performed on the reference frame to obtain the target reference frame. It may be understood that because the resolution of the reference frame is greater than the resolution of the current frame, data of some sub-pixels in the reference frame may be directly reused, and may be used as data corresponding to sub-pixels corresponding to the motion estimation pixel precision.

For the foregoing process of directly performing sub-pixel interpolation processing on the reference frame to obtain the target reference frame, reference may be made to the foregoing description of step S1308. Details are not described herein again.

In an embodiment, step S1504 of processing the reference frame according to the resolution information of the current frame and the motion estimation pixel precision using the sub-pixel interpolation mode, to obtain the corresponding target reference frame includes: if the sub-pixel interpolation mode is a sampled sub-pixel interpolation mode and a resolution indicated by the resolution information of the current frame is greater than a resolution of the reference frame, performing up-sampling processing on the reference frame according to the resolution information of the current frame to obtain an intermediate reference frame, and performing sub-pixel interpolation processing on the intermediate reference frame according to the motion estimation pixel precision, to obtain the corresponding target reference frame.

As discussed above, if the resolution of the current frame is greater than the resolution of the reference frame, the decoding end needs to perform up-sampling processing on the reference frame to obtain the intermediate reference frame with a resolution the same as that of the current frame; and then perform sub-pixel interpolation processing on the intermediate reference frame based on the motion estimation pixel precision corresponding to the current frame, to obtain the target reference frame.

For example, the resolution of the current frame is 2M*2N, and the resolution of the reference frame is 1/2M*1/2N. Up-sampling processing needs to be performed on the reference frame according to a sampling ratio of 1/4 to obtain an intermediate reference frame with a resolution the same as that of the current frame. If the motion estimation pixel precision is 1/2, sub-pixel interpolation processing continues to be performed on the obtained intermediate reference frame according to the pixel interpolation precision of 1/2, to obtain the target reference frame. If the motion estimation pixel precision is 1/4, sub-pixel interpolation processing continues to be performed on the obtained intermediate reference frame according to the pixel interpolation precision of 1/4, to obtain the target reference frame.

In an embodiment, step S1504 of processing the reference frame according to the resolution information of the current frame and the motion estimation pixel precision using the sub-pixel interpolation mode, to obtain the corresponding target reference frame includes: if the sub-pixel interpolation mode is a direct sub-pixel interpolation mode and a resolution indicated by the resolution information of the current frame is the same as a resolution of the reference frame, directly performing sub-pixel interpolation processing on the reference frame according to the motion estimation pixel precision, to obtain the corresponding target reference frame.

Specifically, the input video frame is processed by using the full-resolution processing mode to obtain a current frame, so that the resolution of the current frame is also the original resolution, and if the resolution of the reference frame is also the original resolution, the resolution of the current frame is the same as the resolution of the reference frame. Alternatively, the input video frame is processed by using the down-sampling mode to obtain a current frame, and if the reference frame is also reconstructed through the encoded data obtained by performing encoding by using the down-sampling mode with the same sampling ratio, the resolution of the current frame is the same as the resolution of the reference frame. In this case, the decoding end may directly perform sub-pixel interpolation processing on the reference frame based on the motion estimation pixel precision to obtain the target reference frame, and the pixel interpolation precision corresponding to the sub-pixel interpolation processing is the same as the motion estimation pixel precision.

In the foregoing embodiment, sub-pixel interpolation processing is performed on the reference frame, so that the resolution of the reference frame is higher. In this way, the calculated video frame to be decoded is more precise than the motion vector of the reference frame, thereby further reducing a prediction residual, so that encoding quality can be improved.

Figure 16:
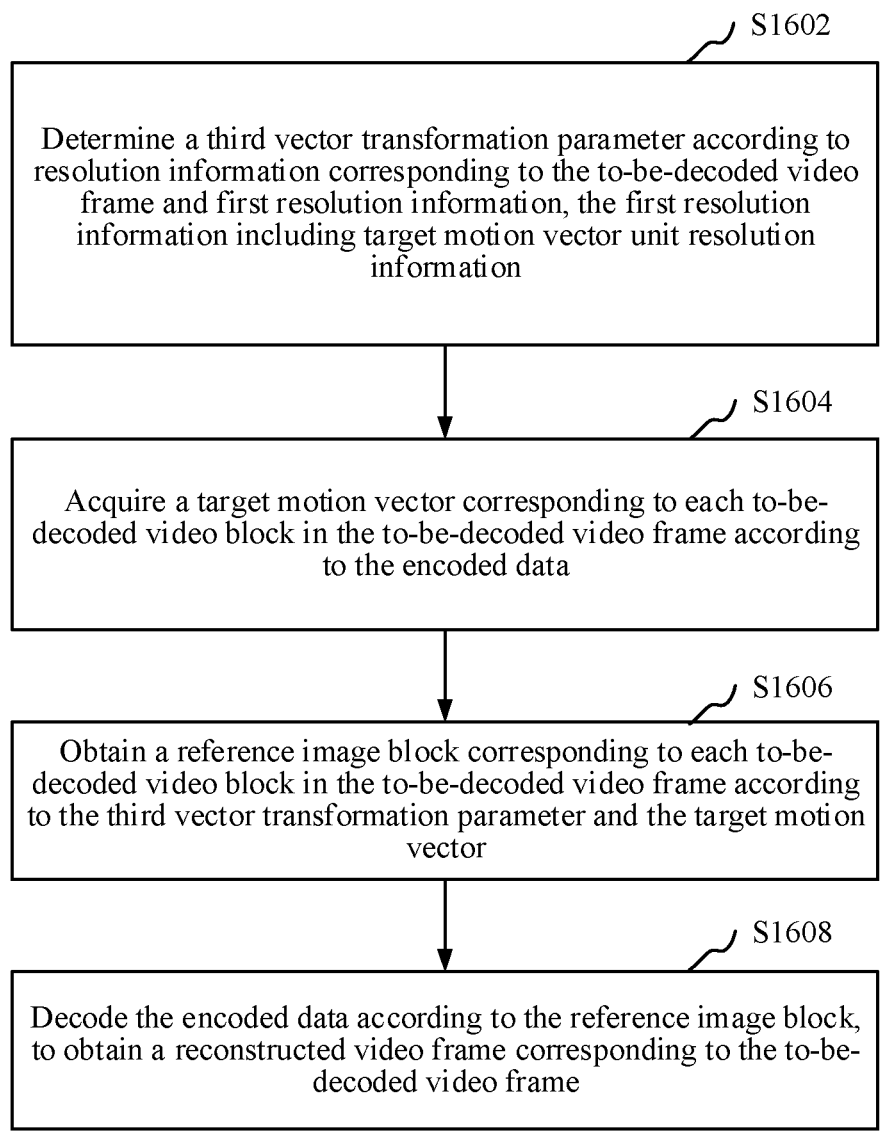
FIG. 16 is a schematic flowchart of decoding encoded data according to a target reference frame, to obtain a reconstructed video frame corresponding to a current video frame according to an embodiment.

In an embodiment, as shown in FIG. 16, step S1310 of decoding the encoded data according to the target reference frame, to obtain a reconstructed video frame corresponding to the current frame includes the following steps.

S1602: Determine a third vector transformation parameter according to resolution information corresponding to the current frame and first resolution information, the first resolution information including target motion vector unit resolution information.

Specifically, the third vector transformation parameter is used for transforming a motion vector or position information of the motion vector. The third vector transformation parameter may be a ratio of the first resolution information to the resolution information of the current frame to be decoded and may be obtained by dividing the resolution information of the current frame by the first resolution information, or may be obtained by dividing the first resolution information by the resolution information of the current frame, or may be obtained by multiplying the ratio by a corresponding coefficient or adding a preset offset to the proportion after the proportion is obtained. For example, assuming that the down-sampling ratio of the reference frame is 1/3, the down-sampling ratio of the current frame is 1/6. The third vector transformation parameter may be 2 obtained by dividing 1/6 by 1/3. It may be understood that because of the correspondence between decoding and encoding, the step of determining a third vector transformation parameter according to resolution information corresponding to the current frame and first resolution information is an inverse process of the step of determining a first vector transformation parameter according to the resolution information of the current frame and the first resolution information. For example, assuming that the down-sampling ratio of the reference frame is 1/3, the down-sampling ratio of the current frame is 1/6. The first vector transformation parameter may be 2 obtained by dividing 1/3 by 1/6. In this way, in the decoding process, because the current frame is a video frame obtained after encoding the current frame, the down-sampling ratio of the reference frame is also 1/3, and the down-sampling ratio corresponding to the current frame is 1/6, so that the third vector transformation parameter is equal to 2 obtained by dividing 1/3 by 1/6.

S1604: Acquire a target motion vector corresponding to each video block to be decoded in the current frame according to the encoded data.

Specifically, if the encoded data carries the target motion vector, the target motion vector is read from the encoded data. If the encoded data carries a motion vector difference, a target predicted motion vector may be calculated, and the target motion vector is obtained according to the motion vector difference and the target predicted motion vector.

S1606: Obtain a reference image block corresponding to each video block to be decoded in the current frame according to the third vector transformation parameter and the target motion vector.

Specifically, after the third vector transformation parameter is obtained, the obtained motion vector or the position information corresponding to the motion vector is transformed according to the third vector transformation parameter to obtain position information corresponding to the reference image block, so as to obtain the reference image block.

S1608: Decode the encoded data according to the reference image block, to obtain a reconstructed video frame corresponding to the current frame.

Specifically, after the reference image block is obtained, a pixel value of each image block in the reconstructed video frame is obtained according to a pixel value of the reference image block and the prediction residual of the video block to be decoded carried in the encoded data, to obtain the reconstructed video frame.

In an embodiment, step S1602 of determining a third vector transformation parameter according to resolution information corresponding to the current frame and first resolution information includes: determining a third vector transformation parameter according to the resolution information corresponding to the current frame and resolution information of the reference frame; and step S1606 of obtaining a reference image block corresponding to each video block to be decoded in the current frame according to the third vector transformation parameter and the target motion vector includes: acquiring first position information corresponding to the current video block to be decoded; and obtaining a target reference image block corresponding to the current video block to be decoded according to the first position information, the third vector transformation parameter, and the target motion vector.

Specifically, second position information corresponding to the target reference image block may be obtained according to the first position information, the third vector transformation parameter, and the target motion vector, and the target reference image block is obtained according to the second position information. Because of the correspondence between encoding and decoding, the process of determining a third vector transformation parameter according to resolution information corresponding to the current frame and first resolution information is an inverse process of determining a first vector transformation parameter according to the resolution information of the current frame and the resolution information of the reference frame.

In an embodiment, if the first vector transformation parameter is a proportion obtained by dividing high resolution information by low resolution information in the resolution information of the current frame and the resolution information of the reference frame, the third vector transformation parameter may be a proportion obtained by dividing the low resolution information by the high resolution information in the resolution information of the current frame and the resolution information of the reference frame. A resolution corresponding to the high resolution information is greater than a resolution corresponding to the low resolution information. The third vector transformation parameter is used for transforming position information of the frame with the low resolution information in the current frame and the reference frame. For example, the resolution of the current frame is 1200*1200 pixels, and the resolution of the reference frame is 600*600 pixels, so that the high resolution is 1200*1200 pixels, and the low resolution is 600*600 pixels. The third vector transformation parameter may be 1/2. Assuming that the first position information is (6, 8) and the target motion vector is (0, 2), the intermediate position information is (6, 8)−(0, 2)=(6, 6), and the second position information corresponding to the target reference block is (6*1/2, 6*1/2)=(3, 3).

In an embodiment, step S1602 of determining a third vector transformation parameter according to resolution information corresponding to the current frame and first resolution information includes: determining a third vector transformation parameter according to the resolution information corresponding to the current frame and the target motion vector unit resolution information; and step S1604 of obtaining a reference image block corresponding to each video block to be decoded in the current frame according to the third vector transformation parameter and the target motion vector includes: obtaining a first motion vector according to the target motion vector and the third vector transformation parameter; and acquiring the target reference image block corresponding to the current video block to be decoded according to the first motion vector.

Specifically, the third vector transformation parameter is determined according to the resolution information corresponding to the current frame and the target motion vector unit resolution information. After the third vector transformation parameter is obtained, the third vector transformation parameter may be multiplied by the target motion vector to use the obtained product as the first motion vector. It may be understood that the process of obtaining a first motion vector according to the third vector transformation parameter and the target motion vector is an inverse process of obtaining a target motion vector corresponding to the current encoded block according to the first vector transformation parameter and the first motion vector. For example, the first vector transformation parameter is equal to 2. The obtained first motion vector is (2, 2), and the target motion vector obtained according to the product of multiplying the first vector transformation parameter by the first motion vector of (2, 2) is (4, 4). In the decoding process, the third vector transformation parameter is 1/2, the obtained target motion vector is (4, 4), and the first motion vector obtained according to the product of multiplying the third vector transformation parameter of 1/2 by the target motion vector of (4, 4) is (2, 2).

In an embodiment, if the encoded data carries the motion vector difference, the acquiring a target motion vector corresponding to each video block to be decoded in the current frame according to the encoded data includes: acquiring a motion vector difference corresponding to a current video block to be decoded in the current frame according to the encoded data; and acquiring an initial predicted motion vector corresponding to the current video block to be decoded; obtaining the second vector transformation coefficient according to current motion vector unit resolution information corresponding to the initial predicted motion vector and the target motion vector unit resolution information; obtaining a target predicted motion vector corresponding to the current video block to be decoded according to the initial predicted motion vector and the second vector transformation coefficient; and obtaining the target motion vector according to the target predicted motion vector and the motion vector difference.

Specifically, because a video block to be decoded corresponds to a video block to be encoded in the decoding process and the encoding process, the same acquisition rule is used for the initial predicted motion vector. Therefore, the initial predicted motion vector corresponding to the current video block to be decoded is consistent with the initial predicted motion vector corresponding to the current video block to be encoded. For the method for obtaining the target predicted motion vector, reference may be made to the method in the encoding process. Details are not described again. The target motion vector may be a sum of the target predicted motion vector and the motion vector difference.

Figure 17:
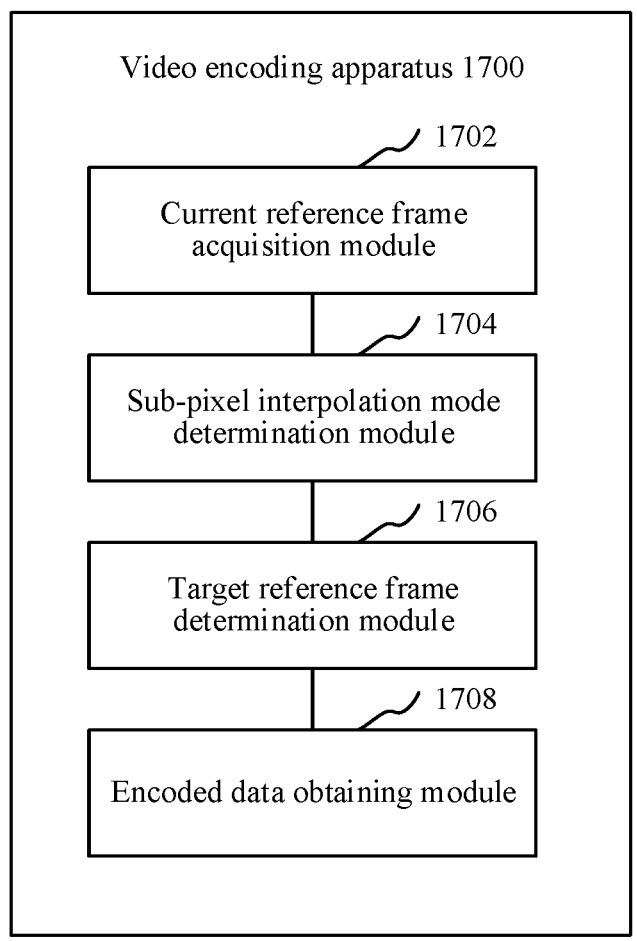
FIG. 17 is a structural block diagram of a video encoding apparatus according to an embodiment.

As shown in FIG. 17, in an embodiment, a video encoding apparatus 1700 is provided. The video encoding apparatus 1700 specifically includes a reference frame acquisition module 1702, a sub-pixel interpolation mode determination module 1704, a target reference frame determination module 1706, and an encoded data obtaining module 1708.

The reference frame acquisition module 1702 is configured to acquire a reference frame corresponding to a current frame to be encoded from a video input.

The sub-pixel interpolation mode determination module 1704 is configured to determine a sub-pixel interpolation mode, the sub-pixel interpolation mode comprising one of a direct sub-pixel interpolation mode and a sampled sub-pixel interpolation mode.

The target reference frame determination module 1706 is configured to process the reference frame according to resolution information of the current frame by using the sub-pixel interpolation mode, to obtain a corresponding target reference frame.

The encoded data obtaining module 1708 is configured to encode the current frame according to the target reference frame, to obtain encoded data corresponding to the current frame.

In an embodiment, the target reference frame determination module 1706 is further configured to: acquire motion estimation pixel precision corresponding to the current frame; and process the reference frame according to the resolution information of the current frame and the motion estimation pixel precision by using the sub-pixel interpolation mode, to obtain the corresponding target reference frame.

In an embodiment, the target reference frame determination module 1706 is further configured to: if the sub-pixel interpolation mode is a sampled sub-pixel interpolation mode and a resolution indicated by the resolution information of the current frame is less than a resolution of the reference frame, perform down-sampling processing on the reference frame according to the resolution information of the current frame to obtain an intermediate reference frame, and perform sub-pixel interpolation processing on the intermediate reference frame according to the motion estimation pixel precision, to obtain the corresponding target reference frame.

In an embodiment, the target reference frame determination module 1706 is further configured to: if the sub-pixel interpolation mode is a direct sub-pixel interpolation mode and a resolution indicated by the resolution information of the current frame is less than a resolution of the reference frame, calculate pixel interpolation precision according to the resolution information of the current frame and the motion estimation pixel precision, and directly perform sub-pixel interpolation processing on the reference frame according to the pixel interpolation precision, to obtain the corresponding target reference frame.

In an embodiment, the target reference frame determination module 1706 is further configured to: if the sub-pixel interpolation mode is a sampled sub-pixel interpolation mode and a resolution indicated by the resolution information of the current frame is greater than a resolution of the reference frame, perform up-sampling processing on the reference frame according to the resolution information of the current frame to obtain an intermediate reference frame, and perform sub-pixel interpolation processing on the intermediate reference frame according to the motion estimation pixel precision, to obtain the corresponding target reference frame.

In an embodiment, the target reference frame determination module 1706 is further configured to: if the sub-pixel interpolation mode is a direct sub-pixel interpolation mode and a resolution indicated by the resolution information of the current frame is the same as a resolution of the reference frame, directly perform sub-pixel interpolation processing on the reference frame according to the motion estimation pixel precision, to obtain the corresponding target reference frame.

In an embodiment, the encoded data obtaining module 1708 is further configured to add the sub-pixel interpolation mode corresponding to the processing of the reference frame to the encoded data corresponding to the current frame.

By using the foregoing video encoding apparatus 1700, after a reference frame corresponding to a current frame is acquired, a sub-pixel interpolation mode of the reference frame may be determined, and the reference frame is processed according to resolution information of the reference frame by using the sub-pixel interpolation mode, to adjust a resolution of the reference frame, and obtain a target reference frame. Even if the resolution of the reference frame is different from that of the current frame, the reference frame may be used as a reference frame for the current frame. The current frame is encoded according to the obtained target reference frame, thereby improving the utilization efficiency of reference frames, so that the accuracy of inter-frame prediction can be improved, a prediction residual can be reduced, and the quality of an encoded image can be improved.

Figure 18:
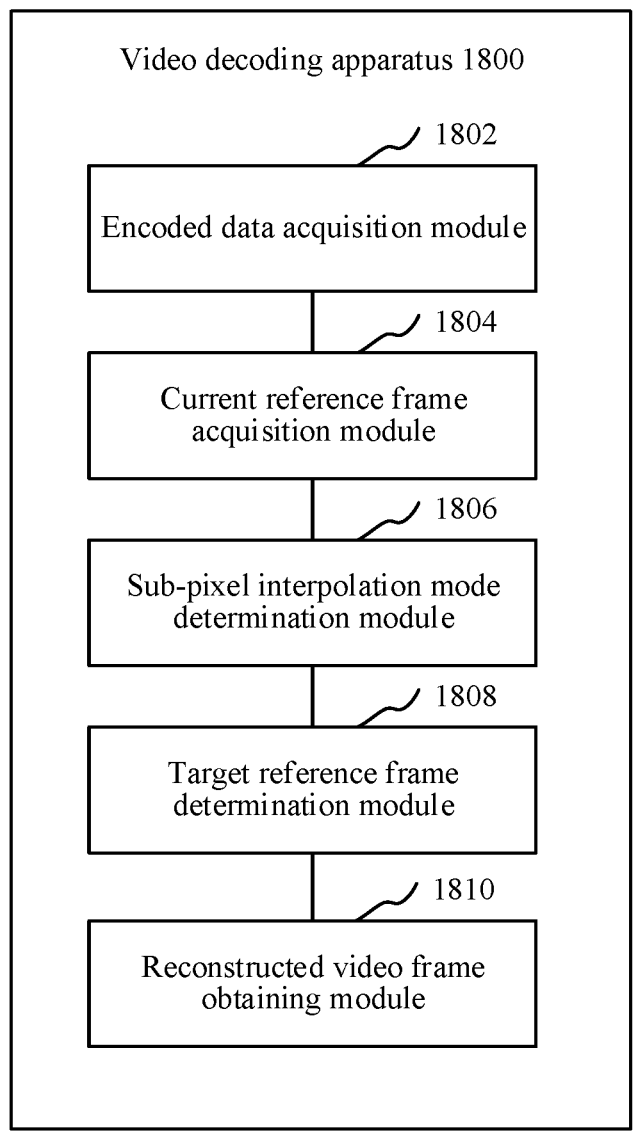
FIG. 18 is a structural block diagram of a video decoding apparatus according to an embodiment.

As shown in FIG. 18, in an embodiment, a video decoding apparatus 1800 is provided. The video decoding apparatus 1800 specifically includes an encoded data acquisition module 1802, a reference frame acquisition module 1804, a sub-pixel interpolation mode determination module 1806, a target reference frame determination module 1808, and a reconstructed video frame obtaining module 1810.

The encoded data acquisition module 1802 is configured to acquire encoded data corresponding to a current frame to be decoded.

The reference frame acquisition module 1804 is configured to acquire a reference frame corresponding to the current frame.

The sub-pixel interpolation mode determination module 1806 is configured to determine a sub-pixel interpolation mode, the sub-pixel interpolation mode comprising one of a direct sub-pixel interpolation mode and a sampled sub-pixel interpolation mode.

The target reference frame determination module 1808 is configured to process the reference frame according to resolution information of the current frame by using the sub-pixel interpolation mode, to obtain a corresponding target reference frame.

The reconstructed video frame obtaining module 1810 is configured to decode the encoded data according to the target reference frame, to obtain a reconstructed video frame corresponding to the current frame.

In an embodiment, the target reference frame determination module 1808 is further configured to: acquire motion estimation pixel precision corresponding to the current frame; and process the reference frame according to the resolution information of the current frame and the motion estimation pixel precision by using the sub-pixel interpolation mode, to obtain the corresponding target reference frame.

In an embodiment, the target reference frame determination module 1808 is further configured to: if the sub-pixel interpolation mode is a sampled sub-pixel interpolation mode and a resolution indicated by the resolution information of the current frame is less than a resolution of the reference frame, perform down-sampling processing on the reference frame according to the resolution information of the current frame to obtain an intermediate reference frame, and perform sub-pixel interpolation processing on the intermediate reference frame according to the motion estimation pixel precision, to obtain the corresponding target reference frame.

In an embodiment, the target reference frame determination module 1808 is further configured to: if the sub-pixel interpolation mode is a direct sub-pixel interpolation mode and a resolution indicated by the resolution information of the current frame is less than a resolution of the reference frame, calculate the pixel interpolation precision according to the resolution information of the current frame and the motion estimation pixel precision, and directly perform sub-pixel interpolation processing on the reference frame according to the pixel interpolation precision, to obtain the corresponding target reference frame.

In an embodiment, the target reference frame determination module 1808 is further configured to: if the sub-pixel interpolation mode is a sampled sub-pixel interpolation mode and a resolution indicated by the resolution information of the current frame is greater than a resolution of the reference frame, perform up-sampling processing on the reference frame according to the resolution information of the current frame to obtain an intermediate reference frame, and perform sub-pixel interpolation processing on the intermediate reference frame according to the motion estimation pixel precision, to obtain the corresponding target reference frame.

In an embodiment, the target reference frame determination module 1808 is further configured to: if the sub-pixel interpolation mode is a direct sub-pixel interpolation mode and a resolution indicated by the resolution information of the current frame is the same as a resolution of the reference frame, directly perform sub-pixel interpolation processing on the reference frame according to the motion estimation pixel precision, to obtain the corresponding target reference frame.

By using the foregoing video decoding apparatus 1800, after encoded data corresponding to a current frame and a reference frame corresponding to the current frame are acquired, a sub-pixel interpolation mode of the reference frame may be determined, and the reference frame is processed according to resolution information of the reference frame by using the sub-pixel interpolation mode, to adjust a resolution of the reference frame, to obtain a target reference frame. Even if the resolution of the reference frame is different from that of the current frame, the reference frame may be used as a reference frame for the current frame. The current frame is encoded according to the obtained target reference frame, thereby improving the utilization efficiency of reference frames, so that the accuracy of inter-frame prediction can be improved, a prediction residual can be reduced, and the quality of an encoded image can be improved.

Figure 19:
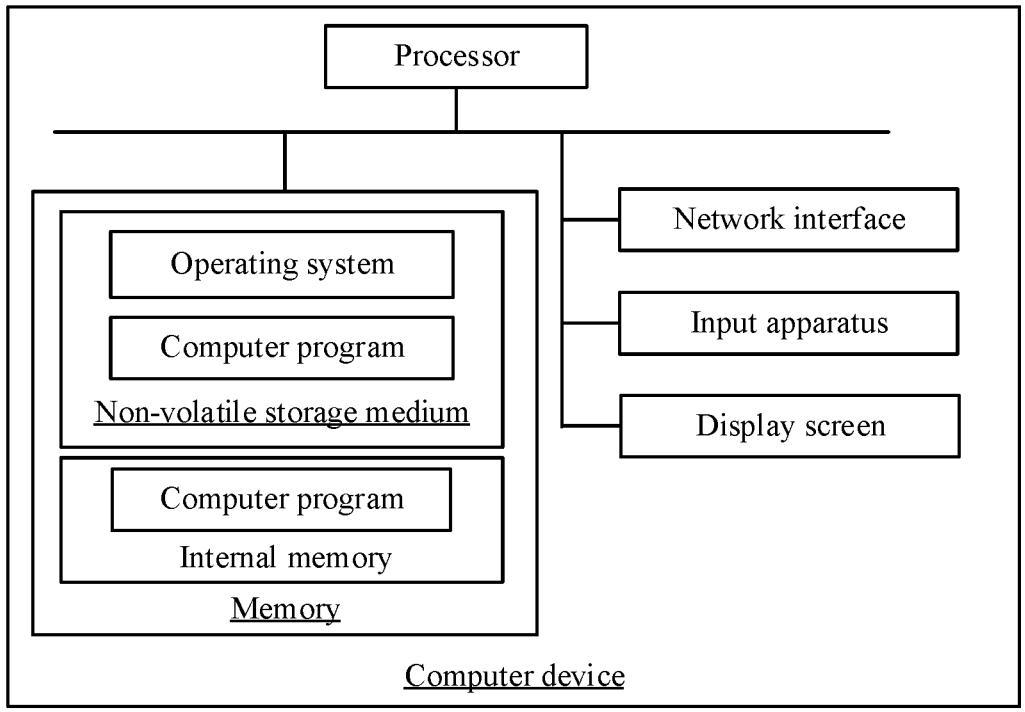
FIG. 19 is a structural block diagram of a computer device according to an embodiment.

FIG. 19 is a diagram of an internal structure of a computer device according to an embodiment. The computer device may be specifically the terminal 110 in FIG. 1. As shown in FIG. 19, the computer device includes a processor, a memory, a network interface, an input apparatus, and a display screen that are connected by using a system bus. The memory includes a non-transitory storage medium and an internal memory. The non-transitory storage medium of the computer device stores an operating system, and may further store a computer program. The computer program, when being executed by the processor, may cause the processor to implement at least one of the video encoding method and the video decoding method described in this disclosure. The internal memory may also store a computer program. When being executed by the processor, the computer program may cause the processor to perform at least one of the video encoding method and the video decoding method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse or the like.

Figure 20:
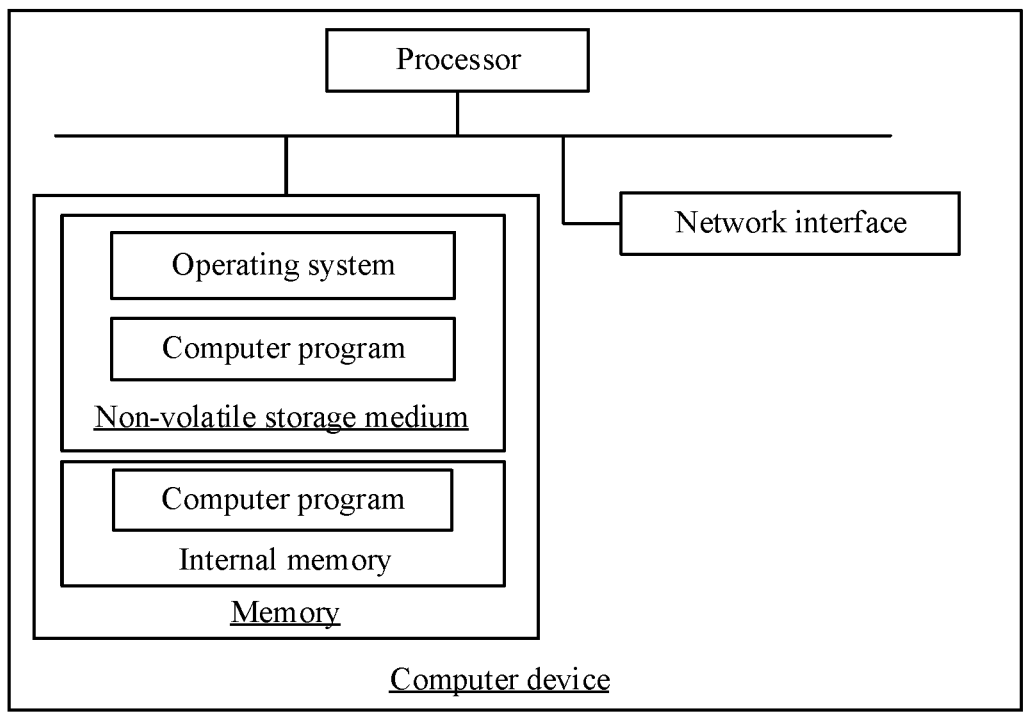
FIG. 20 is a structural block diagram of a computer device according to an embodiment.

FIG. 20 is a diagram of an internal structure of a computer device according to an embodiment. The computer device may be specifically the server 120 in FIG. 1. As shown in FIG. 20, the computer device includes a processor, a memory, a network interface, an input apparatus, and a display screen that are connected by using a system bus. The memory includes a non-transitory storage medium and an internal memory. The non-transitory storage medium of the computer device stores an operating system, and may further store a computer program. The computer program, when being executed by the processor, may cause the processor to implement at least one of the video encoding method and the video decoding method. The internal memory may also store a computer program. When being executed by the processor, the computer program may cause the processor to perform at least one of the video encoding method and the video decoding method described in this disclosure. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse or the like.

A person skilled in the art may understand that, the structure shown in FIG. 19 and FIG. 20 is merely a block diagram of a partial structure related to a solution in this application, and does not constitute a limitation to the computer device to which the solution in this application is applied. Specifically, the computer device may include more or fewer components than those shown in the figure, or have some components combined, or have a different component deployment.

In an embodiment, the video encoding apparatus 1700 provided in this application may be implemented in the form of a computer program. The computer program may run on the computer device shown in FIG. 19 and FIG. 20. The memory of the computer device may store program modules forming the video encoding apparatus, for example, the reference frame acquisition module 1702, the sub-pixel interpolation mode determination module 1704, the target reference frame determination module 1706, and the encoded data obtaining module 1708 shown in FIG. 17. The computer program formed by the various program modules causes the processor to perform the steps of the video encoding method described in the embodiments of this application in this specification.

For example, the computer device shown in FIG. 19 and FIG. 20 may perform step S202 by using the reference frame acquisition module 1702 in the video encoding apparatus 1700 shown in FIG. 17. The computer device may perform step S204 by using the sub-pixel interpolation mode determination module 1704. The computer device may perform step S206 by using the target reference frame determination module 1706. The computer device may perform step S208 by using the encoded data obtaining module 1708.

In an embodiment, the video decoding apparatus 1800 provided in this application may be implemented in the form of a computer program. The computer program may run on the computer device shown in FIG. 19 and FIG. 20. The memory of the computer device may store program modules forming the video decoding apparatus, for example, the encoded data acquisition module 1802, the reference frame acquisition module 1804, the sub-pixel interpolation mode determination module 1806, the target reference frame determination module 1808, and the reconstructed video frame obtaining module 1810 shown in FIG. 16. The computer program formed by the various program modules causes the processor to perform the steps of the video encoding method described in the embodiments of this application in this specification.

For example, the computer device shown in FIG. 19 and FIG. 20 may perform step S1302 by using the encoded data acquisition module 1802 in the video decoding apparatus 1800 shown in FIG. 18. The computer device may perform step S1304 by using the reference frame acquisition module 1804. The computer device may perform step S1306 by using the sub-pixel interpolation mode determination module 1806. The computer device may perform step S1308 by using the target reference frame determination module 1808. The computer device may perform step S1310 by using the reconstructed video frame obtaining module 1810.

In an embodiment, a computer device is provided, including a memory and a processor, the memory storing a computer program, the computer program, when being executed by the processor, implementing the video encoding method or the video decoding method provided in the foregoing embodiments.

By using the foregoing computer device, after a reference frame corresponding to a current frame is acquired, a sub-pixel interpolation mode of the reference frame may be determined, and the reference frame is processed according to resolution information of the reference frame by using the sub-pixel interpolation mode, to adjust a resolution of the reference frame, to obtain a target reference frame. Even if the resolution of the reference frame is different from that of the current frame, the reference frame may be used as a reference frame for the current frame. The current frame is encoded according to the obtained target reference frame, thereby improving the utilization efficiency of reference frames, so that the accuracy of inter-frame prediction can be improved, a prediction residual can be reduced, and the quality of an encoded image can be improved.

By using the foregoing computer device, after encoded data corresponding to a current frame and a reference frame corresponding to the current frame are acquired, a sub-pixel interpolation mode of the reference frame may be determined, and the reference frame is processed according to resolution information of the reference frame by using the sub-pixel interpolation mode, to adjust a resolution of the reference frame, to obtain a target reference frame. Even if the resolution of the reference frame is different from that of the current frame, the reference frame may be used as a reference frame for the current frame. The current frame is encoded according to the obtained target reference frame, thereby improving the utilization efficiency of reference frames, so that the accuracy of inter-frame prediction can be improved, a prediction residual can be reduced, and the quality of an encoded image can be improved.

In an embodiment, a computer-readable storage medium is provided, storing a computer program, the computer program, when being executed by the processor, implementing the video encoding method or the video decoding method provided in the foregoing embodiments.

By using the foregoing computer-readable storage medium, after a reference frame corresponding to a current frame is acquired, a sub-pixel interpolation mode of the reference frame may be determined, and the reference frame is processed according to resolution information of the reference frame by using the sub-pixel interpolation mode, to adjust a resolution of the reference frame, to obtain a target reference frame. Even if the resolution of the reference frame is different from that of the current frame, the reference frame may be used as a reference frame for the current frame. The current frame is encoded according to the obtained target reference frame, thereby improving the utilization efficiency of reference frames, so that the accuracy of inter-frame prediction can be improved, a prediction residual can be reduced, and the quality of an encoded image can be improved.

By using the foregoing computer-readable storage medium, after encoded data corresponding to a current frame and a reference frame corresponding to the current frame are acquired, a sub-pixel interpolation mode of the reference frame may be determined, and the reference frame is processed according to resolution information of the reference frame by using the sub-pixel interpolation mode, to adjust a resolution of the reference frame, to obtain a target reference frame. Even if the resolution of the reference frame is different from that of the current frame, the reference frame may be used as a reference frame for the current frame. The current frame is encoded according to the obtained target reference frame, thereby improving the utilization efficiency of reference frames, so that the accuracy of inter-frame prediction can be improved, a prediction residual can be reduced, and the quality of an encoded image can be improved.

A person of ordinary skill in the art may understand that all or some of the processes of the methods in the foregoing embodiments may be implemented by a computer program instructing relevant hardware. The program may be stored in a non-transitory computer-readable storage medium. When the program runs, the processes of the foregoing methods in the embodiments may be performed. Any reference to a memory, a storage, a database, or another medium used in the various embodiments provided in this application can include a non-transitory and/or volatile memory. The non-transitory memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a rambus direct RAM (RDRAM), a direct rambus dynamic RAM (DRDRAM), and a rambus dynamic RAM (DRAM).

The technical features in the foregoing embodiments may be randomly combined. For concise description, not all possible combinations of the technical features in the embodiment are described. However, the combinations of the technical features shall all be considered as falling within the scope recorded in this specification provided that they do not conflict with each other.

The foregoing embodiments only describe several implementations of this application, and are described in detail, but they shall not be construed as a limitation to the patent scope of this application. A person of ordinary skill in the art may further make variations and improvements without departing from the ideas of this application, which shall fall within the protection scope of this application. Therefore, the protection scope of this application shall be subject to the protection scope of the appended claims.

What is claimed is:

1. A method for video encoding, performed by a computer device, comprising:
    acquiring a reference frame corresponding to a current frame to be encoded from a video input;
    determining a sub-pixel interpolation mode, the sub-pixel interpolation mode comprising one of a direct sub-pixel interpolation mode or a sampled sub-pixel interpolation mode;
    acquiring motion estimation pixel precision corresponding to the current frame;
    processing the reference frame according to the resolution information of the current frame and the motion estimation pixel precision using the sub-pixel interpolation mode, to obtain a corresponding target reference frame by:
        in response to the sub-pixel interpolation mode being determined to be a sampled sub-pixel interpolation mode and a resolution indicated by the resolution information of the current frame being less than a resolution of the reference frame:
            performing down-sampling processing on the reference frame according to the resolution information of the current frame to obtain an intermediate reference frame; and
            performing sub-pixel interpolation processing on the intermediate reference frame according to the motion estimation pixel precision, to obtain the corresponding target reference frame; and
    encoding the current frame according to the target reference frame, to obtain encoded data corresponding to the current frame.

2. The method according to claim 1, wherein processing the reference frame according to the resolution information of the current frame and the motion estimation pixel precision using the sub-pixel interpolation mode, to obtain the corresponding target reference frame further comprises:
    in response to the sub-pixel interpolation mode being determined to be a direct sub-pixel interpolation mode and a resolution indicated by the resolution information of the current frame being less than a resolution of the reference frame:
        calculating pixel interpolation precision according to the resolution information of the current frame and the motion estimation pixel precision; and
        performing sub-pixel interpolation processing on the reference frame directly according to the pixel interpolation precision, to obtain the corresponding target reference frame.

3. The method according to claim 1, wherein processing the reference frame according to the resolution information of the current frame and the motion estimation pixel precision using the sub-pixel interpolation mode, to obtain the corresponding target reference frame further comprises:
    in response to the sub-pixel interpolation mode being determined to be a sampled sub-pixel interpolation mode and a resolution indicated by the resolution information of the current frame being greater than a resolution of the reference frame:
        performing up-sampling processing on the reference frame according to the resolution information of the current frame to obtain an intermediate reference frame; and
        performing sub-pixel interpolation processing on the intermediate reference frame according to the motion estimation pixel precision, to obtain the corresponding target reference frame.

4. The method according to claim 1, wherein processing the reference frame according to the resolution information of the current frame and the motion estimation pixel precision using the sub-pixel interpolation mode, to obtain the corresponding target reference frame further comprises:
    in response to the sub-pixel interpolation mode being determined to be a direct sub-pixel interpolation mode and a resolution indicated by the resolution information of the current frame being the same as a resolution of the reference frame:
        performing sub-pixel interpolation processing on the reference frame directly according to the motion estimation pixel precision, to obtain the corresponding target reference frame.

5. The method according to claim 1, further comprising:
adding information associated with the sub-pixel interpolation mode corresponding to the processing of the reference frame to the encoded data corresponding to the current frame.

6. The method according to claim 5, wherein adding information associated with the sub-pixel interpolation mode to the encoded data comprises:
adding the information associated with the sub-pixel interpolation mode into header information of the encoded data corresponding to the current frame, the sub-pixel interpolation mode information being used for indicating a sub-pixel interpolation mode corresponding to the processing of the reference frame.

7. The method according to claim 6, wherein the header information comprises sequence header information, group header information, or frame header information of the encoded data corresponding to the current frame.

8. A method for video decoding, comprising:
acquiring encoded data corresponding to a current frame to be decoded from a video input;
acquiring a reference frame corresponding to the current frame;
determining a sub-pixel interpolation mode, the sub-pixel interpolation mode comprising one of a direct sub-pixel interpolation mode or a sampled sub-pixel interpolation mode;
acquiring motion estimation pixel precision corresponding to the current frame;
processing the reference frame according to the resolution information of the current frame and the motion estimation pixel precision using the sub-pixel interpolation mode, to obtain a corresponding target reference frame by:
in response to the sub-pixel interpolation mode being determined to be a sampled sub-pixel interpolation mode and a resolution indicated by resolution information of the current frame is less than a resolution of the reference frame:
performing down-sampling processing on the reference frame according to the resolution information of the current frame to obtain an intermediate reference frame, and
performing sub-pixel interpolation processing on the intermediate reference frame according to the motion estimation pixel precision, to obtain the target reference frame; and
decoding the encoded data according to the target reference frame, to obtain a reconstructed video frame corresponding to the current frame.

9. The method according to claim 8, wherein processing the reference frame according to the resolution information of the current frame and the motion estimation pixel precision using the sub-pixel interpolation mode, to obtain the corresponding target reference frame further comprises:
in response to the sub-pixel interpolation mode being determined to be a direct sub-pixel interpolation mode and a resolution indicated by the resolution information of the current frame is less than a resolution of the reference frame:
calculating pixel interpolation precision according to the resolution information of the current frame and the motion estimation pixel precision; and
performing sub-pixel interpolation processing on the reference frame directly according to the pixel interpolation precision, to obtain the corresponding target reference frame.

10. The method according to claim 8, wherein processing the reference frame according to the resolution information of the current frame and the motion estimation pixel precision using the sub-pixel interpolation mode, to obtain the corresponding target reference frame further comprises:
in response to the sub-pixel interpolation mode being determined to be a sampled sub-pixel interpolation mode and a resolution indicated by the resolution information of the current frame is greater than a resolution of the reference frame:
performing up-sampling processing on the reference frame according to the resolution information of the current frame to obtain an intermediate reference frame; and
performing sub-pixel interpolation processing on the intermediate reference frame according to the motion estimation pixel precision, to obtain the corresponding target reference frame.

11. The method according to claim 8, wherein processing the reference frame according to the resolution information of the current frame and the motion estimation pixel precision using the sub-pixel interpolation mode, to obtain the corresponding target reference frame further comprises:
in response to the sub-pixel interpolation mode being determined to be a direct sub-pixel interpolation mode and a resolution indicated by the resolution information of the current frame is the same as a resolution of the reference frame:
performing sub-pixel interpolation processing on the reference frame directly according to the motion estimation pixel precision, to obtain the corresponding target reference frame.

12. The method according to claim 8, wherein determining the sub-pixel interpolation mode further comprises:
acquiring sub-pixel interpolation mode information from header information of the encoded data corresponding to the current frame, the sub-pixel interpolation mode information being used for indicating a sub-pixel interpolation mode corresponding to the processing of the reference frame.

13. The method according to claim 12, wherein the header information comprises sequence header information, group header information, or frame header information of the encoded data corresponding to the current frame.

14. An apparatus for video encoding, comprising a memory for storing computer readable instructions and a processor in communication with the memory, wherein the processor is configured to execute the computer readable instructions to cause the apparatus to:
acquire a reference frame corresponding to a current frame to be encoded from a video input;
determine a sub-pixel interpolation mode, the sub-pixel interpolation mode comprising one of a direct sub-pixel interpolation mode or a sampled sub-pixel interpolation mode;
acquire motion estimation pixel precision corresponding to the current frame;
process the reference frame according to the resolution information of the current frame and the motion estimation pixel precision using the sub-pixel interpolation mode, to obtain a corresponding target reference frame by:
in response to the sub-pixel interpolation mode being determined to be a sampled sub-pixel interpolation mode and a resolution indicated by the resolution information of the current frame being less than a resolution of the reference frame:

perform down-sampling processing on the reference frame according to the resolution information of the current frame to obtain an intermediate reference frame; and perform sub-pixel interpolation processing on the intermediate reference frame according to the motion estimation pixel precision, to obtain the corresponding target reference frame; and encode the current frame according to the target reference frame, to obtain encoded data corresponding to the current frame.

15. The apparatus according to claim 14, wherein, when the processor is configured to cause the apparatus to process the reference frame according to the resolution information of the current frame and the motion estimation pixel precision using the sub-pixel interpolation mode, to obtain the corresponding target reference frame, the processor is configured to further cause the apparatus to:

in response to the sub-pixel interpolation mode being determined to be a direct sub-pixel interpolation mode and a resolution indicated by the resolution information of the current frame is less than a resolution of the reference frame:

calculate pixel interpolation precision according to the resolution information of the current frame and the motion estimation pixel precision; and perform sub-pixel interpolation processing on the reference frame directly according to the pixel interpolation precision, to obtain the corresponding target reference frame.

16. The apparatus according to claim 14, wherein, when the processor is configured to cause the apparatus to process the reference frame according to the resolution information of the current frame and the motion estimation pixel precision using the sub-pixel interpolation mode, to obtain the corresponding target reference frame, the processor is configured to further cause the apparatus to:

in response to the sub-pixel interpolation mode being determined to be a sampled sub-pixel interpolation mode and a resolution indicated by the resolution information of the current frame is greater than a resolution of the reference frame:

perform up-sampling processing on the reference frame according to the resolution information of the current frame to obtain an intermediate reference frame; and perform sub-pixel interpolation processing on the intermediate reference frame according to the motion estimation pixel precision, to obtain the corresponding target reference frame.

17. The apparatus according to claim 14, wherein, when the processor is configured to cause the apparatus to process the reference frame according to the resolution information of the current frame and the motion estimation pixel precision using the sub-pixel interpolation mode, to obtain the corresponding target reference frame, the processor is configured to further cause the apparatus to:

in response to the sub-pixel interpolation mode being determined to be a direct sub-pixel interpolation mode and a resolution indicated by the resolution information of the current frame is the same as a resolution of the reference frame:

perform sub-pixel interpolation processing on the reference frame directly according to the motion estimation pixel precision, to obtain the corresponding target reference frame.

18. The apparatus according to claim 14, wherein, when the processor executes the computer readable instructions, the processor is configured to further cause the apparatus to:

add information associated with the sub-pixel interpolation mode corresponding to the processing of the reference frame to the encoded data corresponding to the current frame.

19. The apparatus according to claim 18, wherein, when the processor is configured to cause the apparatus to add information associated with the sub-pixel interpolation mode to the encoded data, the processor is configured to cause the apparatus to:

add the information associated with the sub-pixel interpolation mode into header information of the encoded data corresponding to the current frame, the sub-pixel interpolation mode information being used for indicating a sub-pixel interpolation mode corresponding to the processing of the reference frame.

20. The apparatus according to claim 19, wherein the header information comprises sequence header information, group header information, or frame header information of the encoded data corresponding to the current frame.

* * * * *